US007050502B2

(12) United States Patent
Yasunari et al.

(10) Patent No.: US 7,050,502 B2
(45) Date of Patent: May 23, 2006

(54) METHOD AND APPARATUS FOR MOTION VECTOR DETECTION AND MEDIUM STORING METHOD PROGRAM DIRECTED TO THE SAME

(75) Inventors: Tomoko Yasunari, Neyagawa (JP); Shinya Kadono, Nishinomiya (JP); Satoshi Kondo, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 675 days.

(21) Appl. No.: 10/243,844

(22) Filed: Sep. 16, 2002

(65) Prior Publication Data
US 2003/0053544 A1 Mar. 20, 2003

(30) Foreign Application Priority Data
Sep. 18, 2001 (JP) ............................. 2001-283675

(51) Int. Cl.
*H04N 7/12* (2006.01)
(52) U.S. Cl. .................................. 375/240.16
(58) Field of Classification Search ................ 348/413, 348/415, 416, 699, 398, 417; 375/240.16, 375/240.12, 240.24, 240.17; 382/236
See application file for complete search history.

(56) References Cited

U.S. PATENT DOCUMENTS 6,674,798 B1 * 1/2004 Uramoto et al. ........ 375/240.16
6,765,965 B1 * 7/2004 Hanami et al. ........ 375/240.16
6,842,483 B1 * 1/2005 Au et al. ................ 375/240.12
2002/0009144 A1 * 1/2002 Ishihara et al. ........ 375/240.16

OTHER PUBLICATIONS

"MPEG-4 Video Verification Model Version 11.0" Touradj Ebrahimi et al., JTC1/SC29/WG11 MPEG98/N2172 Tokyo, published by ISO/IEC, pp. 1-2, pp. 39-53, Mar. 1998.
"Predictive Coding Based on Efficient Motion Estimation" Ram Srinivasan et al., IEEE Transactions on Communications, vol. COM-33, No. 8, pp. 888-896e, Aug. 1985.

* cited by examiner

*Primary Examiner*—Vu Le
*Assistant Examiner*—Behrooz Senfi
(74) *Attorney, Agent, or Firm*—Wenderoth, Lind & Ponack, L.L.P.

(57) ABSTRACT

A method and apparatus for performing motion estimation under a motion estimation mode suitable for an amount of motion within each E-block detects a motion vector with a small amount of computation. A block division section divides a frame to be encoded into E-blocks of a predetermined pixel size. For each target E-block, a motion estimation mode detection section relies on a past motion vector of a predetermined block to predict an amount of motion, and determines a motion estimation mode defining a search area that enables detection of the predicted amount of motion among a plurality of predefined motion estimation modes. If the predicted amount of motion is small, a mode defining a narrow search area and a fine search resolution is selected. If the predicted amount of motion is large, a mode defining a broad search area and a coarse search resolution is selected.

19 Claims, 23 Drawing Sheets

FIG. 6

FRAME TO BE ENCODED

| | | | | | | | |
|---|---|---|---|---|---|---|---|
| | BLOCK 0 | BLOCK 1 | BLOCK 2 | | | ... | |
| | BLOCK 3 | E-BLOCK | | | | | |
| | | | | | | | |
| | ⋮ | | | | | | |
| | | | | | | | |

● ARE TARGET PIXELS FOR BOTH REGIONS A AND B

● ARE TARGET PIXELS FOR REGION A
○ ARE TARGET PIXELS FOR REGION B

FIG. 21 PRIOR ART
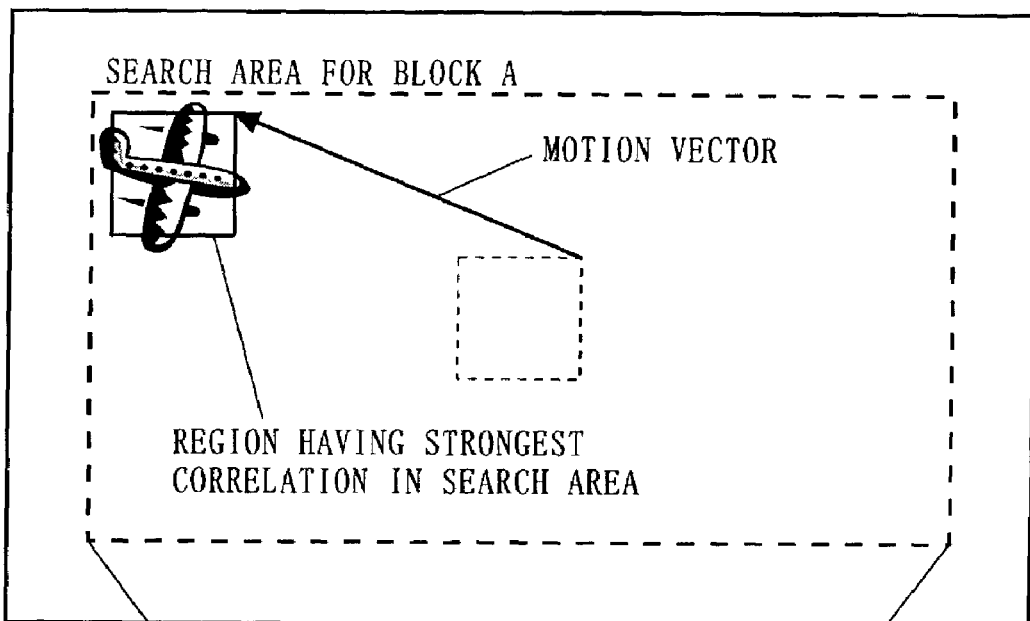
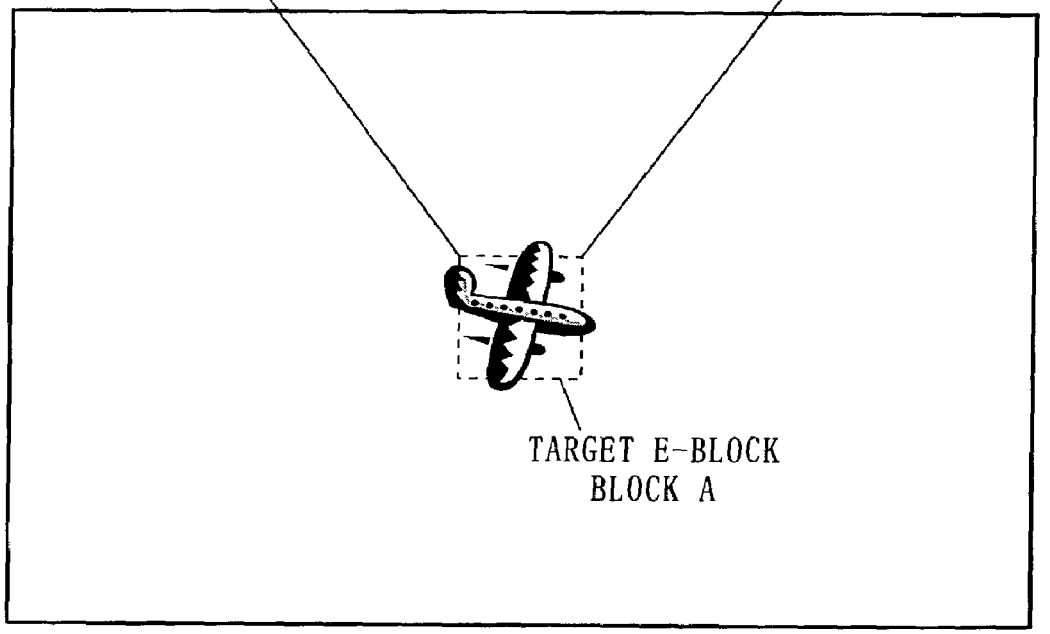

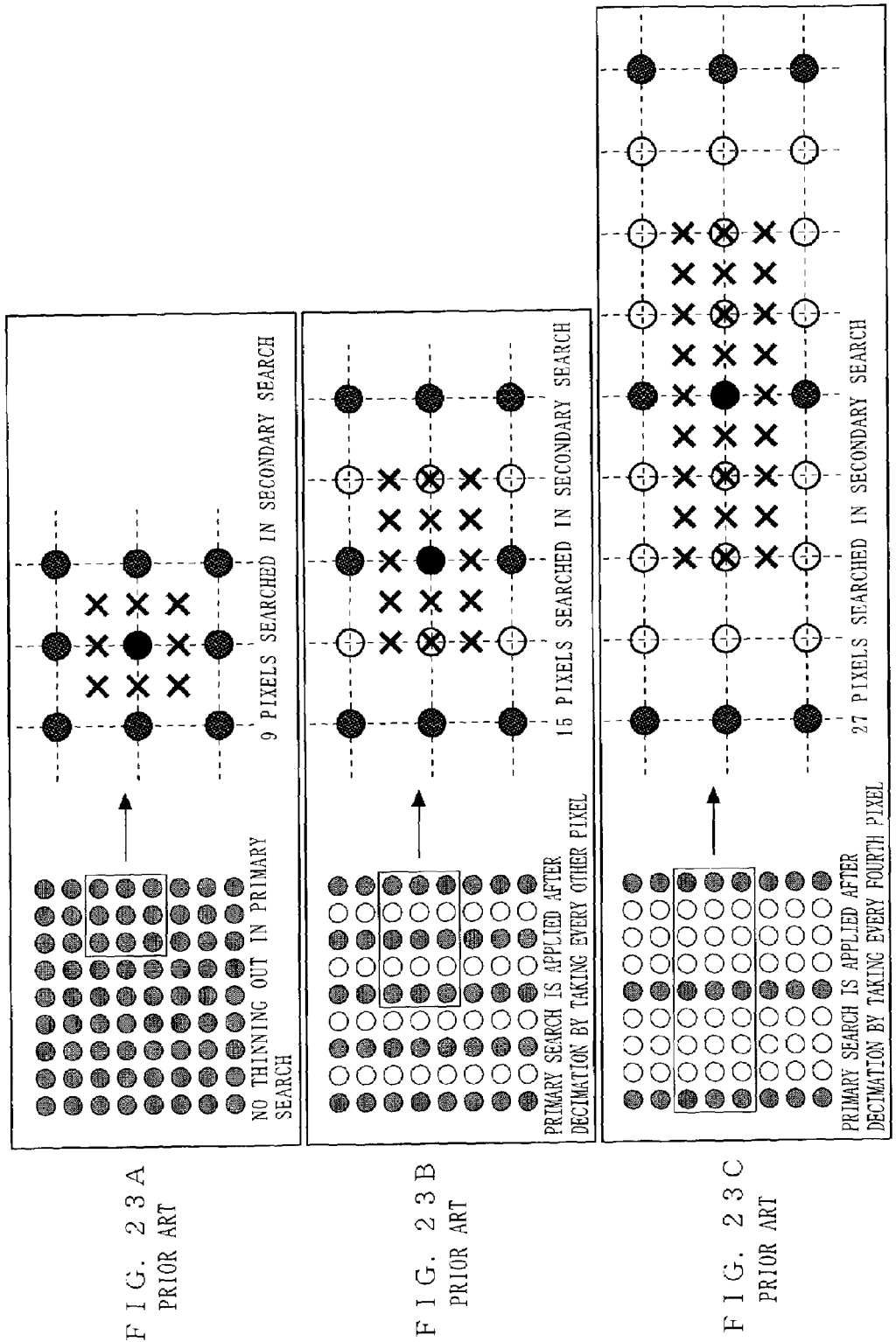

METHOD AND APPARATUS FOR MOTION VECTOR DETECTION AND MEDIUM STORING METHOD PROGRAM DIRECTED TO THE SAME

BACKGROUND OF THE INVENTION

1. Field of the Invention

The present invention relates to a method and apparatus for motion vector detection and a medium storing a method program directed to the same. More particularly, the present invention relates to: a method for detecting a motion vector for a frame to be encoded which is used in motion-compensated predictive encoding as a compression encoding technique for moving pictures; a motion vector detection apparatus using that method; and a recording medium storing a program for executing the method.

2. Description of the Background Art

Conventionally, methods for providing an improved encoding efficiency in moving pictures encoding are known which employ a so-called motion vector to predict and compensate for a motion in a block (hereinafter abbreviated as an "E-block") having a predetermined size within a frame to be encoded in an effort to eliminate redundancy regarding time. A "motion vector" refers to information concerning a correlation between an E-block and a given spatial position in a given frame or field constituting a referenced frame. As used herein, a "frame to be encoded" refers to an image frame to be subjected to an encoding process. A "reference frame" refers to an already-encoded image frame which may lie before or after a given frame to be encoded on the time axis. Note that, instead of a frame, a field may also be used as a reference frame, and a plurality of reference frames may be referred to if necessary; in the present specification any allusion to a "reference frame" is intended to cover all such meanings. One method for obtaining a motion vector is a block matching method.

Details of techniques concerning motion-compensated predictive encoding are described in, for example, "JTC1/SC29/WG11 MPEG98/N2172 Tokyo, March 1998", published by ISO/IEC.

FIG. 21 illustrates the concept of motion vector detection based on the block matching method. As shown in FIG. 21, in a motion vector detection based on the block matching method, pixel-to-pixel differences (e.g., sums of absolute differences) between an E-block to be processed (hereinafter referred to as a "target E-block") and a plurality of regions (hereinafter referred to as "S-blocks") each having the same size as that of the E-block, which are demarcated in a search area within the reference frame, are calculated. The S-block which has the smallest difference is detected as a block having the strongest correlation with the target E-block (hereinafter referred to as a "correlated block"). The temporal/spatial offset between the target E-block and the correlated block thereof is detected as a motion vector.

This motion vector detection technique aims to detect a block which is associated with the smallest encoding amount, in order to improve encoding efficiency in motion-compensated predictive encoding. Therefore, in order to detect a block having a strong correlation for images involving substantial motion, the search area should be as large as possible. However, since the motion vector detection processing requires pixel-by-pixel computation (i.e., error calculation, that is, difference calculation) for all of the plurality of areas made within a search area, motion vector detection processing accounts for a large amount of computation in the encoding process. Thus, merely enlarging a search area will necessitate greater-scale hardware.

As a technique for performing block matching while preventing such an increase in the amount of computation, an OTS (One at a Time Search) technique has been proposed. FIG. 22 is a diagram for illustrating the concept of the conventional OTS technique. FIG. 22 is a diagram for facilitating the understanding of the OTS technique, where search positions are shown as non-overlapping regions (shown as circles) centered around representative pixels. Thus, individual circles represent the respective block positions.

According to this OTS technique, regarding a central S-block (chosen at a predetermined position) and four neighboring S-blocks (i.e., S-blocks denoted as "1" in FIG. 22), sums of absolute differences in pixel data with respect to the target E-block are respectively calculated. A "sum of absolute difference" (hereinafter abbreviated as "SAD") is obtained, with respect to each block (shown as a circle) and the target E-block, as a cumulative sum of absolute values of differences between the corresponding pixels in the two blocks. Next, the SAD in the central S-block and the SADs in the four neighboring S-blocks are compared. If any one of the neighboring S-blocks has an SAD smaller than that of the central S-block, that neighboring S-block is then regarded as a new central S-block, and the SADs of similarly-chosen five S-blocks (i.e., S-blocks denoted as "2") are again calculated. This process is repeated until the SAD of the central S-block becomes the smallest (i.e., S-blocks denoted as "3" and S-blocks denoted by the subsequent numbers). Thus, an S-block having a strong correlation with the target E-block, i.e., a correlated block can be detected with a relatively small amount of computation.

OTS-related techniques are described in detail in, for example, IEEE, "IEEE TRANSACTIONS ON COMMUNICATIONS, VOL. COM-33, NO. 8, AUGUST 1985, pp. 888–896e".

However, the aforementioned OTS technique only performs relative comparisons between the SAD of the central S-block and the SADs of the neighboring S-blocks. Therefore, when the OTS technique is used alone, the correlated block may not be properly obtained depending on the content of the pictures. In other words, since searches are only performed in the direction of neighboring blocks having stronger correlations, it may not be possible to accurately detect a motion vector for an isolated S-block (i.e., an S-block marked by a strong correlation but bounded by S-blocks of a weaker correlation) or pictures containing complicated image patterns.

Accordingly, there has been proposed a method which realizes an enlarged search area without necessitating a greater-scale hardware method, where pixels are searched coarsely (i.e., the number of the pixels searched is made smaller, this being generally referred to as "decimated") with respect to the enlarged portion of the search area, and only the pixels which are thus decimated are subjected to matching calculation, thereby coming to an equal amount of computation per one block method.

However, according to this method, a search must be performed after previously removing high-frequency components to decimate the pixels, and a problem of image quality deterioration may arise with images which are rich in high-frequency components.

There is another motion vector detection method called "two-step search method". The two-step search method first performs a motion estimation (primary search) with a resolution on the order of an integer number of pixels (hereinafter referred to as a "full-pixel resolution"), and then performs a further motion estimation (secondary search) with a resolution on the order of 0.5 pixels (hereinafter referred to as a "half-pixel resolution"), directed to the vicinity of the pixels which have been detected by the primary search (i.e., pixels having a relatively high correlation). Pixels to be searched (hereinafter referred to as "searched pixels") according to the two-step search method will be described with reference to FIGS. 23A to 23C. In FIGS. 23A to 23C, too, each circle represents a representative pixel position of a block.

FIG. 23A illustrates an exemplary case where the searched pixels (represented as hatched circles) in a primary search are all pixels. In this case, the searched pixels in a secondary search are a total of 9 pixels: a pixel which has been detected through the primary search (represented as a solid black circle) as well as the surrounding 8 sub-pixels (represented as "X") with a half-pixel resolution. FIG. 23B illustrates an exemplary case where the searched pixels in a primary search are every other pixel. In this case, the searched pixels in a secondary search are a total of 15 pixels: a pixel which has been detected through the primary search as well as the surrounding 14 sub-pixels with a half-pixel resolution (including pixels which have not been searched in the primary search; represented as blank circles). FIG. 23C illustrates an exemplary case where the searched pixels in a primary search are every fourth pixel. In this case, the searched pixels in a secondary search are a total of 27 pixels: a pixel which has been detected through the primary search as well as the surrounding 26 pixels with a half-pixel resolution (including pixels which have not been searched in the primary search; represented as blank circles).

The two-step search method, which can decimate pixels through the primary search, is very effective for downscaling the primary search circuitry. However, according to the aforementioned two-step search method, the pixels which are not targets in the primary search are targeted in the secondary search, as described above. As a result, as shown in FIG. 23C, if the number of pixels discarded in the decimated search is increased in order to reduce the number of searched pixels in the primary search, the searched pixels in the secondary search are increased, thus requiring upscaling of the secondary search circuitry.

The secondary search in the two-step search method does not need to be performed with a half-pixel resolution. For example, the secondary search may be performed with a resolution on the order of 0.25 pixels (hereinafter referred to as a "quarter-pixel resolution") to attain a higher resolution. Furthermore, it would be possible to perform a secondary search with a half-pixel resolution and then perform a tertiary search with a quarter-pixel resolution (thus realizing a three-step search method).

SUMMARY OF THE INVENTION

Therefore, an object of the present invention is to provide a method and apparatus for motion vector detection and a medium storing a method program directed to the same, capable of detecting a motion vector with a relatively small amount of computation (small circuit scale) while maintaining a good image quality, where motion estimation is performed for each E-block by employing a motion estimation mode (which may define a search area alone or a search area and a search resolution) which is suitable for the size of the motion in the image.

The present invention has the following features to attain the above object.

A first aspect of the present invention is directed to a motion vector detection method for detecting a motion vector in a frame to be encoded which is used in motion-compensated predictive encoding of moving pictures, comprising: a step of dividing the frame to be encoded into a plurality of E-blocks of a predetermined pixel size; a step of predicting an amount of motion in a target E-block to be processed by using a motion vector associated with a block which is encoded before the target E-block; a step of determining a search area in a reference frame in accordance with the predicted amount of motion in the target E-block, wherein the reference frame is an already-encoded frame; a step of calculating an evaluation index for each of a plurality of S-blocks which are demarcated in the search area determined in the reference frame, the plurality of S-blocks being at a predetermined pixel interval and each having the predetermined pixel size, wherein the evaluation index represents a correlation between the S-block and the target E-block; and a step of detecting a motion vector associated with the target E-block in accordance with a temporal/spatial difference between a correlated block and the target E-block, wherein the correlated block is one of the plurality of S-blocks having a highest correlation as determined by comparing a plurality of said evaluation indices against one another.

Thus, according to the first aspect, motion estimation in an E-block is performed by dynamically varying a search area so as to enable detection of a predicted amount of motion in the E-block. As a result, a motion estimation having an improved search resolution according to each individual E-block can be realized.

In a preferable detection method, the step of determining determines, from among a plurality of predefined motion estimation modes each defining a respectively different search area in the reference frame, a motion estimation mode corresponding to the predicted amount of motion in the target E-block; the step of calculating extracts pixel data from within the target E-block and pixel data from within the search area in the reference frame in accordance with the determined motion estimation mode, and calculates a sum of absolute differences in pixel data between the target E-block and each of the plurality of S-blocks as the evaluation index; and the step of detecting detects the temporal/spatial offset between the correlated block and the target E-block as the motion vector associated with the target E-block.

In another preferable detection method, the step of determining determines, from among a plurality of predefined motion estimation modes each defining a respectively different search area in the reference frame and a search resolution, a motion estimation mode corresponding to the predicted amount of motion in the target E-block; the step of calculating extracts pixel data from within the target E-block and pixel data from within the search area in the reference frame in accordance with the determined motion estimation mode, the extracted pixel data being decimated in accordance with the search resolution, and calculates a sum of absolute differences in pixel data between the target E-block and each of the plurality of S-blocks as the evaluation index; and the step of detecting detects the temporal/spatial offset between the correlated block and the target E-block as the motion vector associated with the target E-block.

Thus, a motion estimation in an E-block may be performed by introducing a plurality of motion estimation modes each defining a search area or a search area and a search resolution and selecting a motion estimation mode which enables detection of a predicted amount of motion in the E-block, whereby a motion estimation having an improved search resolution according to each individual E-block can be realized. By employing previously-obtained motion vector information concerning blocks, the amount of motion in an E-block is predicted before encoding, and a search area which is in accordance with the prediction is secured. As a result, even if the motion of an object in the image undergoes a drastic change, a motion estimation mode which is in accordance with that motion can be quickly selected.

Preferably, the step of predicting predicts the amount of motion in the target B-block based on a size of the motion vector associated with spatially preceding one or more of the E-blocks in the frame to be encoded, the spatially preceding one or more E-blocks having been encoded before the target E-block.

Thus, an amount of motion in the E-block may be predicted by utilizing motion vector information concerning other E-blocks, for which an encoding process has been completed before the target E-block, whereby it becomes possible to accurately predict the amount of motion in the E-block.

Preferably, the step of predicting predicts the amount of motion in the target E-block based on sizes of the motion vectors associated with the spatially identical but temporally preceding E-block in the reference frame and a plurality of E-blocks adjoining the spatially identical but temporally preceding E-block, the spatially identical but temporally preceding E-block having been encoded before the target E-block.

Thus, an amount of motion in the E-block may be predicted by utilizing motion vector information concerning a block within a reference frame which is selected at the same position as that of the E-block as well as the surrounding blocks thereof, whereby it becomes possible to accurately predict the amount of motion in the E-block.

Furthermore, preferably, wherein the step of predicting predicts the amount of motion in the target E-block based on sizes of the motion vectors associated with the spatially identical but temporally preceding E-block in the reference frame and a plurality of E-blocks adjoining the spatially identical but temporally preceding E-block, the spatially identical but temporally preceding E-block and the adjoining E-blocks having been encoded before the target E-block.

Thus, a correlation between images along the spatial axis and a correlation between images along the time axis may be employed, the amount of motion in an E-block may be predicted before encoding, and a search area which is in accordance with the prediction may be secured. As a result, even if the motion of an object in the image undergoes a drastic change, a motion estimation mode which is in accordance with that motion can be quickly selected.

Preferably, the plurality of motion estimation modes define a coarser search resolution in accordance with an increase in the search area.

By thus defining motion estimation modes, it becomes possible to secure a larger search area for the same amount of computation (and hence the same circuit scale), thereby making it possible to sufficiently cope with an E-block containing a relatively large motion.

The detection method according to the first aspect may further comprise: a step of determining whether the S-block having the highest correlation is located at a border of the search area or not; and a step of newly calculating, for each of a plurality of S-blocks demarcated outside the search area in the reference frame, an evaluation index representing a correlation between the S-block and the target E-block if the S-block having the highest correlation is located at a border of the search area, wherein the step of detecting compares a plurality of said evaluation indices inside and outside the search area in the reference frame, and determines the S-block having the highest correlation as the correlated block.

In this case, preferably the step of newly calculating and the step of detecting comprise searching for an S-block having a progressively higher correlation by a technique of calculating and comparing an evaluation index of a neighboring S-block in a one-at-a-time fashion, starting from the S-block having the highest correlation within the search area in the reference frame.

Thus, a prospectively correlated block may be determined in a search area according to a motion estimation mode-based technique, and if this prospectively correlated block is found to be located at a border of the search area, then the OTS technique may be employed to determine whether or not any block exists outside the search area that shows a stronger correlation than the prospectively correlated block. As a result, it becomes possible to search for a correlated block for the target E-block in an efficient manner without requiring a large amount of computation.

Alternatively, the detection method according to the first aspect may further comprise: a step of oversampling the reference frame with a resolution higher than a full-pixel resolution; a step of calculating, for each of predetermined pixel blocks in the oversampled reference frame, an evaluation index representing a correlation between the pixel block and the target E-block, the calculation being centered around a pixel position represented by the motion vector having a full-pixel resolution detected by the step of detecting; and a step of detecting, with a resolution higher than a full-pixel resolution, a temporal/spatial difference between a correlated block and the target E-block as a motion vector associated with the target E-block, wherein the correlated block is one of the pixel blocks having a highest correlation as determined by comparing a plurality of said evaluation indices against one another.

Thus, even in the case where pixels are decimated during a primary search in a motion vector detection apparatus which performs a two-step search, only specific pixels are searched in a secondary search. Thus, by optimizing the searched pixels used for the motion vector detection with a resolution higher than a full-pixel resolution, a motion vector can be obtained without inviting an increase in the scale of the circuitry associated with the secondary search, or the same image quality can be maintained while reducing the scale of the circuitry associated with the secondary search.

A second aspect of the present invention is directed to a motion vector detection apparatus for detecting a motion vector in a frame to be encoded which is used in motion-compensated predictive encoding of moving pictures, comprising: a block division section for dividing the frame to be encoded into a plurality of E-blocks of a predetermined pixel size; a motion amount prediction section for predicting an amount of motion in a target E-block to be processed by using a motion vector associated with a block which is encoded before the target E-block; a search area determination section for determining a search area in a reference frame in accordance with the amount of motion in the target E-block as predicted by the motion amount prediction section, wherein the reference frame is an already-encoded frame; a motion vector detection section for calculating an evaluation index for each of a plurality of S-blocks which are demarcated in the search area determined in the reference frame by the search area determination section, the plurality of S-blocks being at a predetermined pixel interval and each having the predetermined pixel size, wherein the evaluation index represents a correlation between the S-block and the target E-block, and detecting a motion vector associated with the target E-block in accordance with a temporal/spatial difference between a correlated block and the target E-block, wherein the correlated block is one of the plurality of S-blocks having a highest correlation as determined by comparing a plurality of said evaluation indices against one another.

A third aspect of the present invention is directed to a program for realizing a method for detecting a motion vector in a frame to be encoded which is used in motion-compensated predictive encoding of moving pictures, comprising: a step of dividing the frame to be encoded into a plurality of E-blocks of a predetermined pixel size; a step of predicting an amount of motion in a target E-block to be processed by using a motion vector associated with a block which is encoded before the target E-block; a step of determining a search area in a reference frame in accordance with the predicted amount of motion in the target E-block, wherein the reference frame is an already-encoded frame; a step of calculating an evaluation index for each of a plurality of S-blocks which are demarcated in the search area determined in the reference frame, the plurality of S-blocks being at a predetermined pixel interval and each having the predetermined pixel size, wherein the evaluation index represents a correlation between the S-block and the target E-block; and a step of detecting a motion vector associated with the target E-block in accordance with a temporal/spatial difference between a correlated block and the target E-block, wherein the correlated block is one of the plurality of S-blocks having a highest correlation as determined by comparing a plurality of said evaluation indices against one another.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram illustrating blocks referred to by the motion estimation mode detection section 105 in predicting an amount of motion in a target E-block;

FIG. 21 is a diagram illustrating the concept of motion vector detection based on a conventional block matching method.

FIGS. 23A, 23B, and 23C are diagrams illustrating searched pixels in a conventional two-step search method.

DESCRIPTION OF THE PREFERRED EMBODIMENTS

Figure 1:
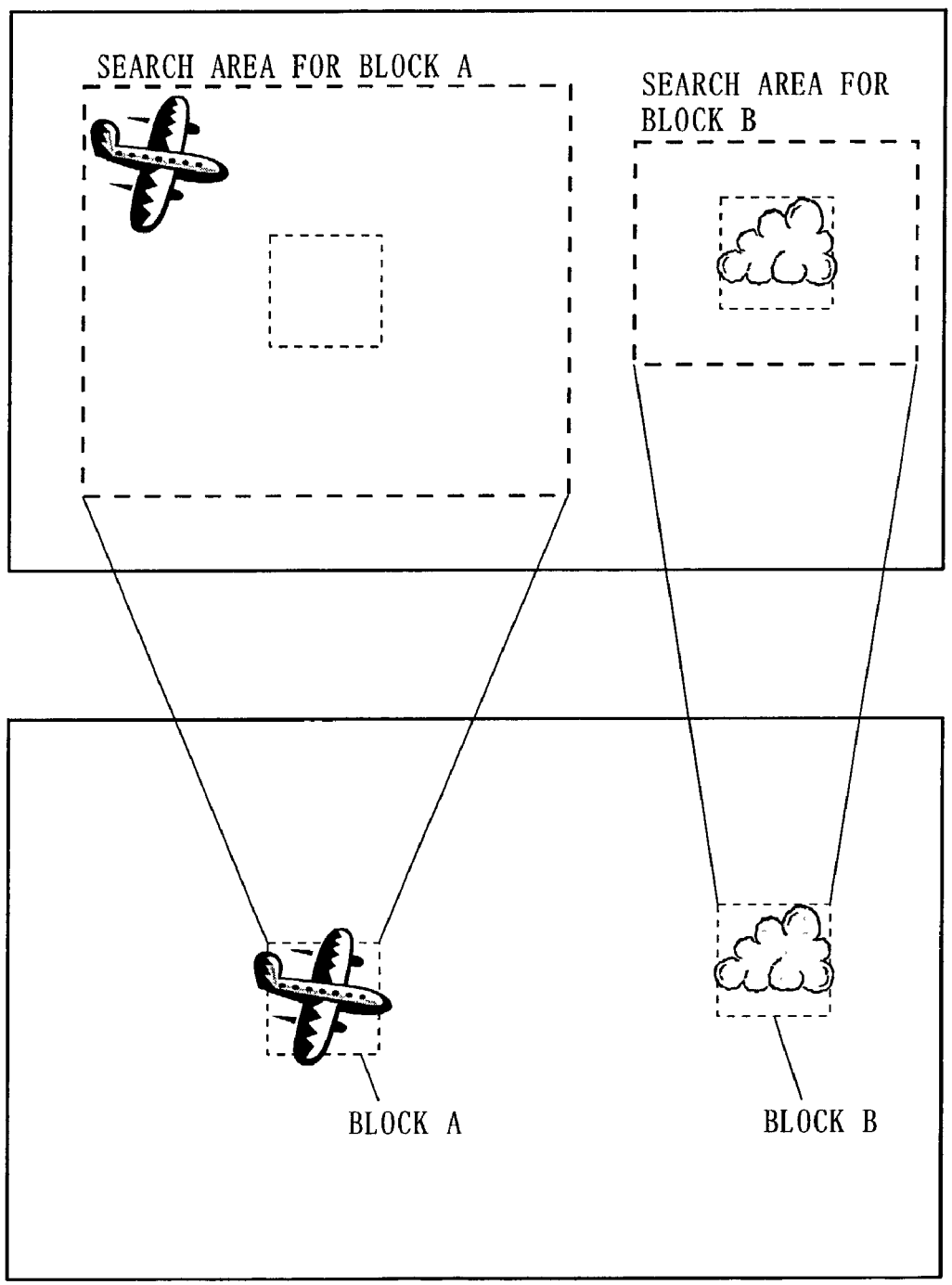
FIG. 1 is a diagram illustrating the outline of a motion vector detection method according to the present invention.

First, the outline of a motion vector detection method according to the present invention will be described. FIG. 1 shows an image of a flying airplane. Within this frame, portions other than the airplane contain relatively small motions, so that any motion therein can be detected even within a narrow search area. On the other hand, since the portion corresponding to the airplane presents a relatively large motion, a broad search area is required to detect the motion thereof.

According to the present invention, the amount of motion in an E-block is predicted, and a motion estimation is performed for the E-block by employing a motion estimation mode which defines a predetermined search area depending on the amount of motion. For example, in the case of a block containing a relatively large motion, e.g., block A, the motion is detected by employing a motion estimation mode which defines a relatively broad search area. In the case of a block containing a relatively small motion, e.g., block B, the motion is detected by employing a motion estimation mode which defines a relatively narrow search area.

Hereinafter, the present invention will be described by way of illustrative embodiments, with reference to the accompanying figures.

First Embodiment

Figure 2:
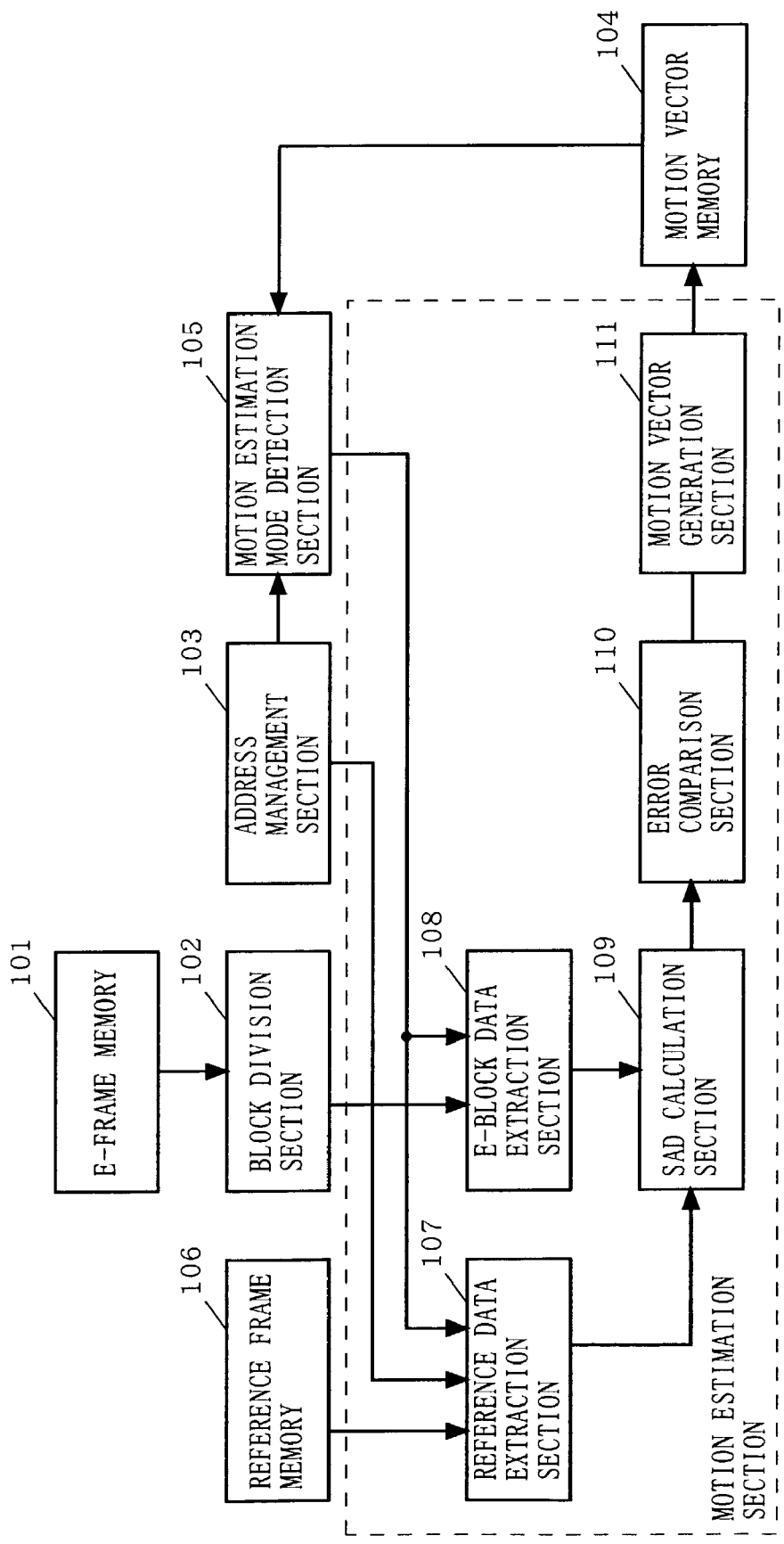
FIG. 2 is a block diagram illustrating the structure of a motion vector detection apparatus according to first to third embodiments of the present invention.

FIG. 2 is a block diagram illustrating the structure of a motion vector detection apparatus according to the first embodiment of the present invention. As shown in FIG. 2, the motion vector detection apparatus according to the first embodiment comprises an E-frame memory 101, a block division section 102, an address management section 103, a motion vector memory 104, a motion estimation mode detection section 105, a reference frame memory 106, a reference data extraction section 107, an E-block data extraction section 108, an SAD calculation section 109, an error comparison section 110, and a motion vector generation section 111.

Hereinafter, a motion vector detection method performed by the motion vector detection apparatus according to the first embodiment having the above-described structure will be described.

The E-frame memory 101 stores a frame to be encoded as an image frame to be subjected to the encoding process.

The block division section 102 divides the frame to be encoded into blocks (E-blocks) of a predetermined pixel size. In this example, it is assumed that the pixels within the frame to be encoded are divided into n blocks, each of which is 8 pixels (horizontally) by 8 pixels (vertically) (FIG. 3).

Figure 3:
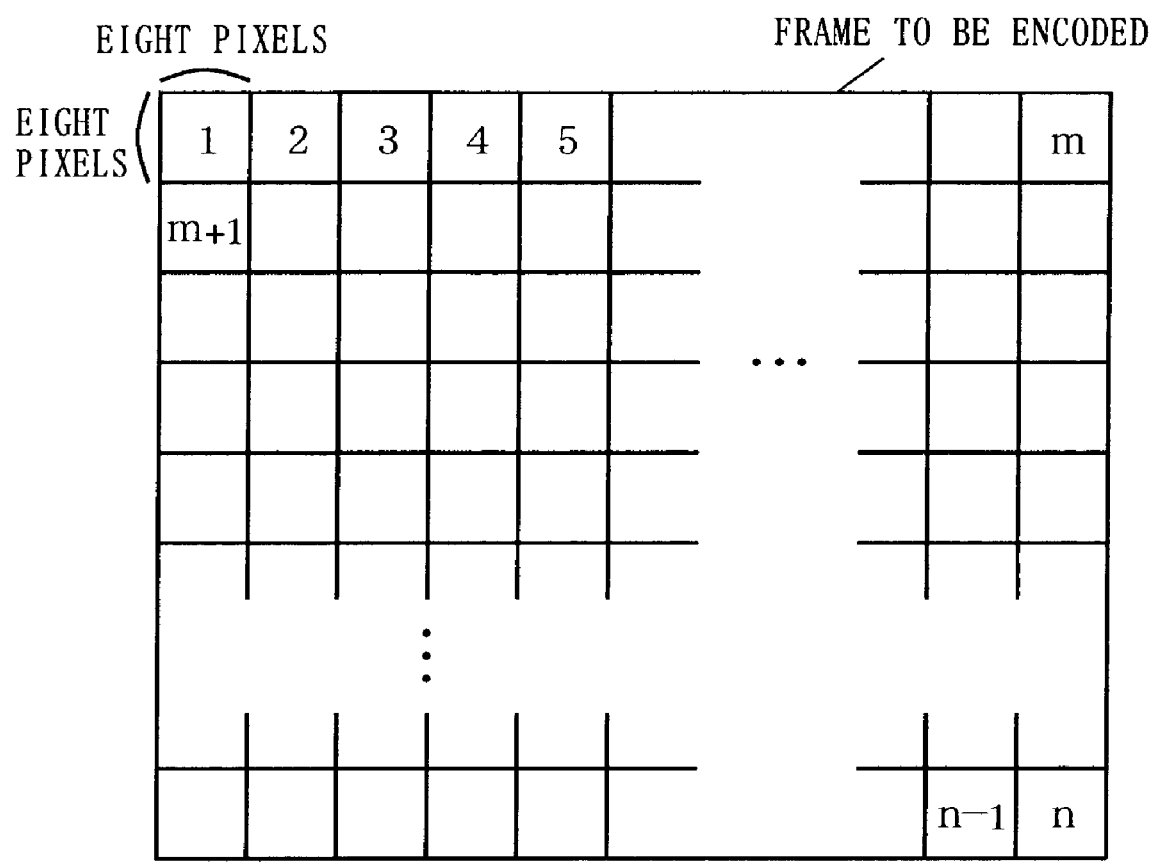
FIG. 3 is a diagram illustrating exemplary block division performed by a block division section 102 and exemplary block position management performed by an address management section 103.
Figure 4A:
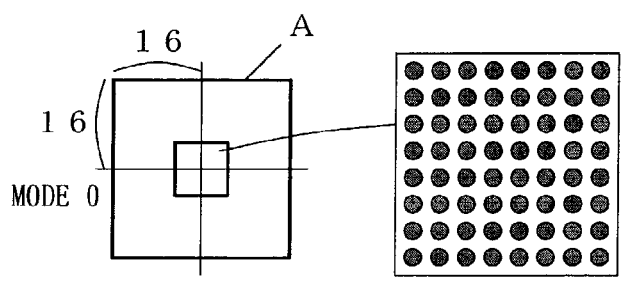
FIGS. 4A, 4B, 4C are diagrams illustrating exemplary motion estimation modes which are predefined in a motion estimation mode detection section 105.
Figure 4B:
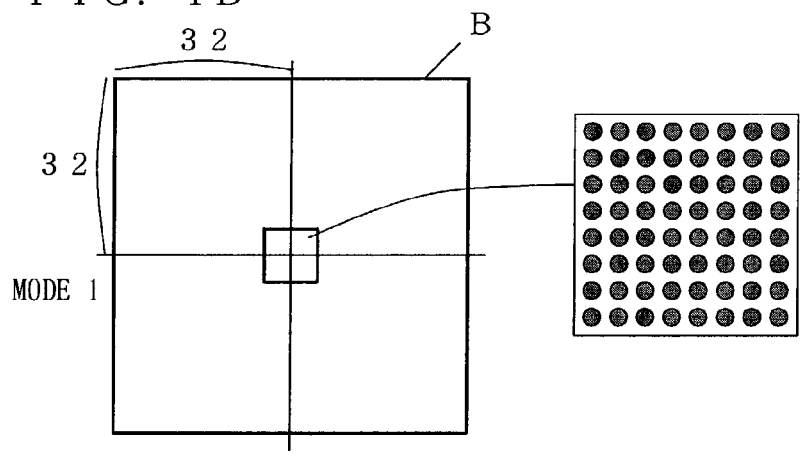
Figure 4C:
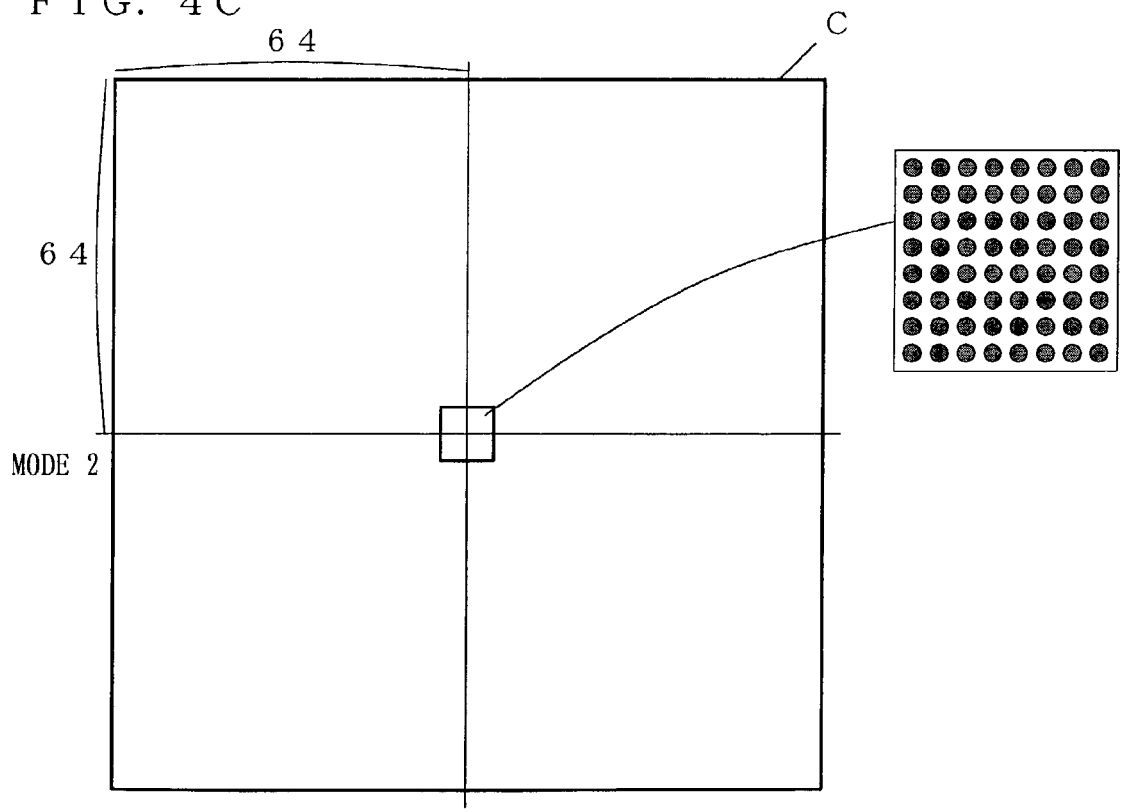

The address management section 103 assigns sequential addresses (1 to n) to the n-divided E-blocks in a direction of scanning, i.e., from the top left to the bottom right within the frame to be encoded, and manages the positions of the E-blocks based on these addresses (FIG. 3). The order of addresses corresponds to the order of subjecting the respective E-blocks to encoding processes.

The motion vector memory 104 stores motion vectors concerning E-blocks in the frame to be encoded which have been obtained through hitherto-performed encoding processes and motion vectors concerning other image frames.

For each target E-block, i.e., an encodable block to be processed, the motion estimation mode detection section 105 retrieves the position of the target E-block within the frame to be encoded from the address management section 103, and past motion vectors in a predetermined block associated with that position from the motion vector memory 104, and predicts the amount of motion in the target E-block. Then, from among a plurality of predetermined motion estimation modes, the motion estimation mode detection section 105 determines a motion estimation mode which defines a search area that will enable the detection of the predicted amount of motion, and outputs the motion estimation mode to the reference data extraction section 107 and the E-block data extraction section 108.

Further referring to FIGS. 4A, 4B, 4C, 5A, 5B, 5C, 6, and 7, processes to be performed by the motion estimation mode detection section 105 will be described in detail.

FIGS. 4A, 4B, 4C, 5A, 5B, 5C are diagrams illustrating exemplary motion estimation modes which are predefined in the motion estimation mode detection section 105. Each of the motion estimation modes illustrated in FIGS. 4A to 4C only defines a search area in which to perform a motion estimation process for an E-block. Each of the motion estimation modes illustrated in FIGS. 5A to 5C defines a search area in which to perform a motion estimation process for an E-block as well as a search resolution (i.e., the degree to which pixels are decimated) to be used for that search area. In each of the motion estimation modes illustrated in FIGS. 4A to 4C, priority is given to the motion estimation resolution, whereas in each of the motion estimation modes illustrated in FIGS. 5A to 5C, priority is given to the amount of computation. In the respective embodiments to follow, motion estimation modes which define both a search area and a search resolution (FIGS. 5A to 5C) will be discussed.

Figure 5A:
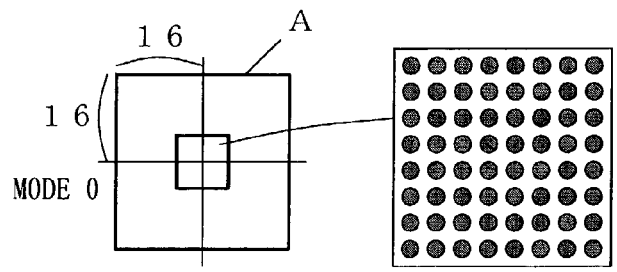
FIGS. 5A, 5B, 5C are diagrams illustrating exemplary motion estimation modes which are predefined in the motion estimation mode detection section 105.
Figure 5B:
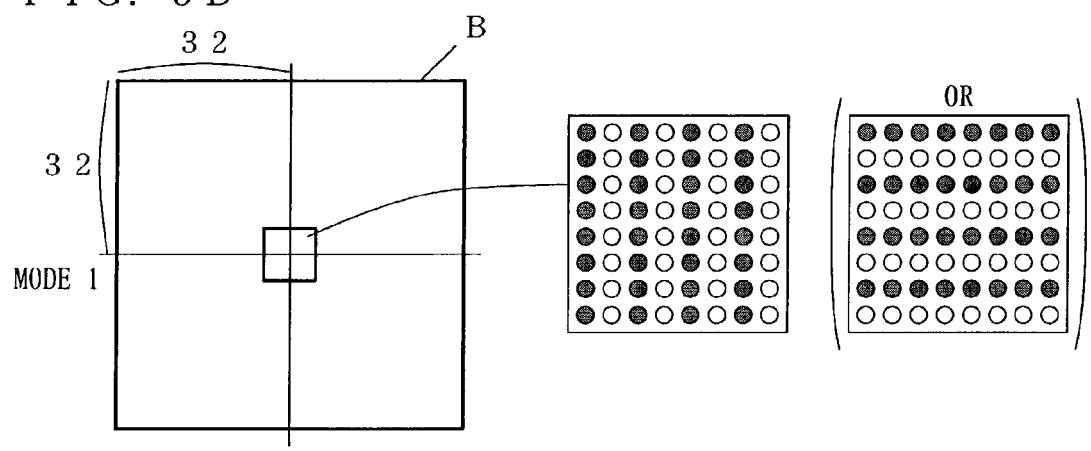
Figure 5C:
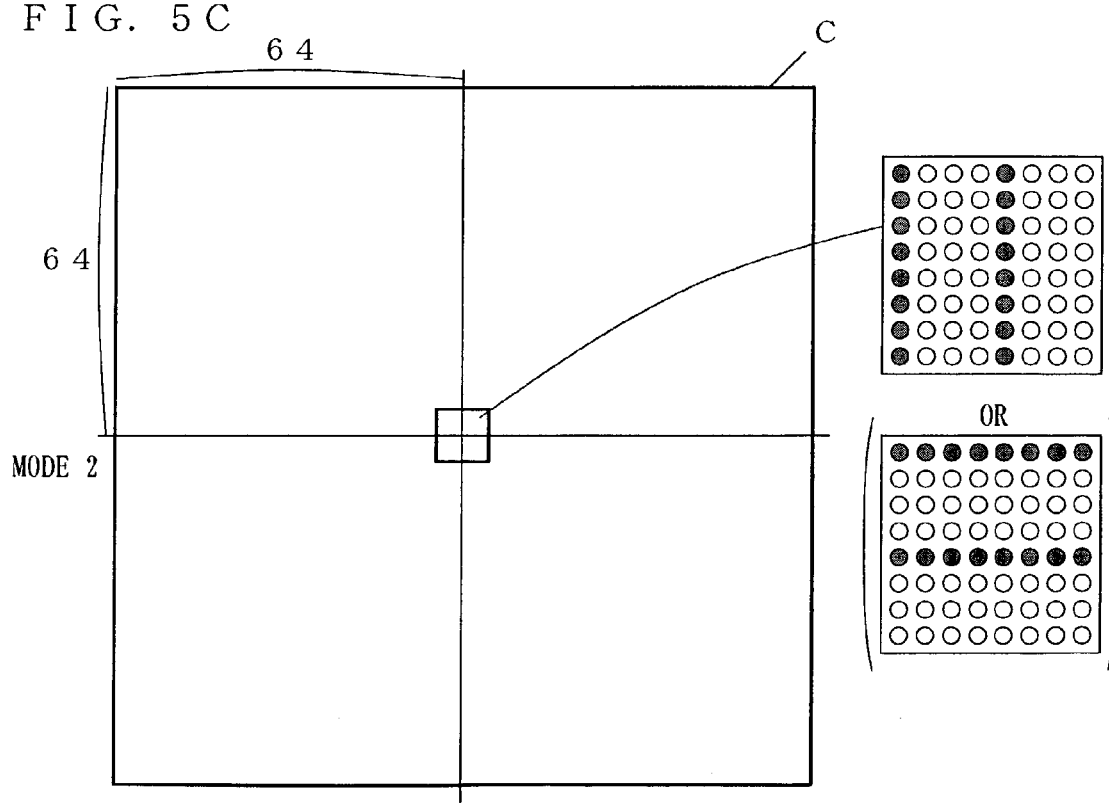

FIG. 5A illustrates "mode 0", which defines a search area corresponding to an area A (having a horizontal and vertical expanse of ±16 pixels around a central position of a given target E-block), such that all of the pixels within the search area are targets of the motion estimation process. FIG. 5B illustrates "mode 1", defining a search area corresponding to an area B (having a similarly-defined horizontal and vertical expanse of ±32 pixels) which is four times as large as the area A, such that every other pixel along the horizontal or vertical direction within the search area are targets of the motion estimation process. FIG. 5C illustrates "mode 2", defining a search area corresponding to an area C (having a similarly-defined horizontal and vertical expanse of ±64 pixels) which is four times as large as the area B, such that every fourth pixel along the horizontal or vertical direction within the search area are targets of the motion estimation process.

Thus, the motion estimation modes illustrated in FIGS. 5A to 5C are prescribed so that the pixels to be searched are selected more coarsely (i.e., decimated) as the size of the search area increases, thus making it possible to select any one of various search areas that require the same amount of computation (and hence the same circuit scale). That is, in mode 1 (FIG. 5B), which defines a search area four times as large as that of mode 0, the amount of computation required in the motion estimation process is reduced to ¼ (since both the pixel extraction process and the pixel calculation process are reduced to a ½ workload), thereby arriving at the same total amount of computation as in mode 0. Similarly, in mode 2 (FIG. 5C), which defines a search area sixteen times as large as that of mode 0, the amount of computation in the motion estimation process is reduced to ¹⁄₁₆ (since both the pixel extraction process and the pixel calculation process are reduced to a ¼ workload), thereby arriving at the same total amount of computation as in mode 0.

It will be appreciated that FIGS. 5A to 5C merely illustrate examples assuming that each E-block is composed of 8×8 pixels; instead, the motion estimation mode can be arbitrarily predefined in accordance with the E-block size, desirable image quality, and/or constraints concerning computation amount. Hereinafter, the present invention will be described with respect to an exemplary case where the motion estimation mode predefined in the motion estimation mode detection section 105 defines a search area in which pixels are decimated along the horizontal direction.

According to the present embodiment, if the motion contained in a target E-block is predicted to be small, the motion estimation mode is set to mode 0 as shown in FIG. 5A. If the motion is predicted to be of a size which cannot be detected through a search under mode 0, the motion estimation mode is set to mode 1 as shown in FIG. 5B. Furthermore, if the motion is predicted to be of a size which cannot be detected through a search under mode 1, the motion estimation mode is set to mode 2 as shown in FIG. 5C.

FIG. 6 is a diagram illustrating blocks referred to by the motion estimation mode detection section 105 in predicting an amount of motion in a target E-block. As shown in FIG. 6, the motion estimation mode detection section 105 refers to four adjoining blocks (blocks 0 to 3) in the frame to be encoded, i.e., upper-left, upper, upper-right, and left adjoining blocks of the target E-block. Note that motion vectors have already been derived for E-blocks 0 to 3, even before those for the target E-block are derived (based on the order of addresses as managed in the address management section 103). As for any E-block for which it is impossible to rely on all or some of such adjoining blocks 0 to 3, e.g., E-block at address "1", a process using a default value as described later will be performed.

Figure 7:
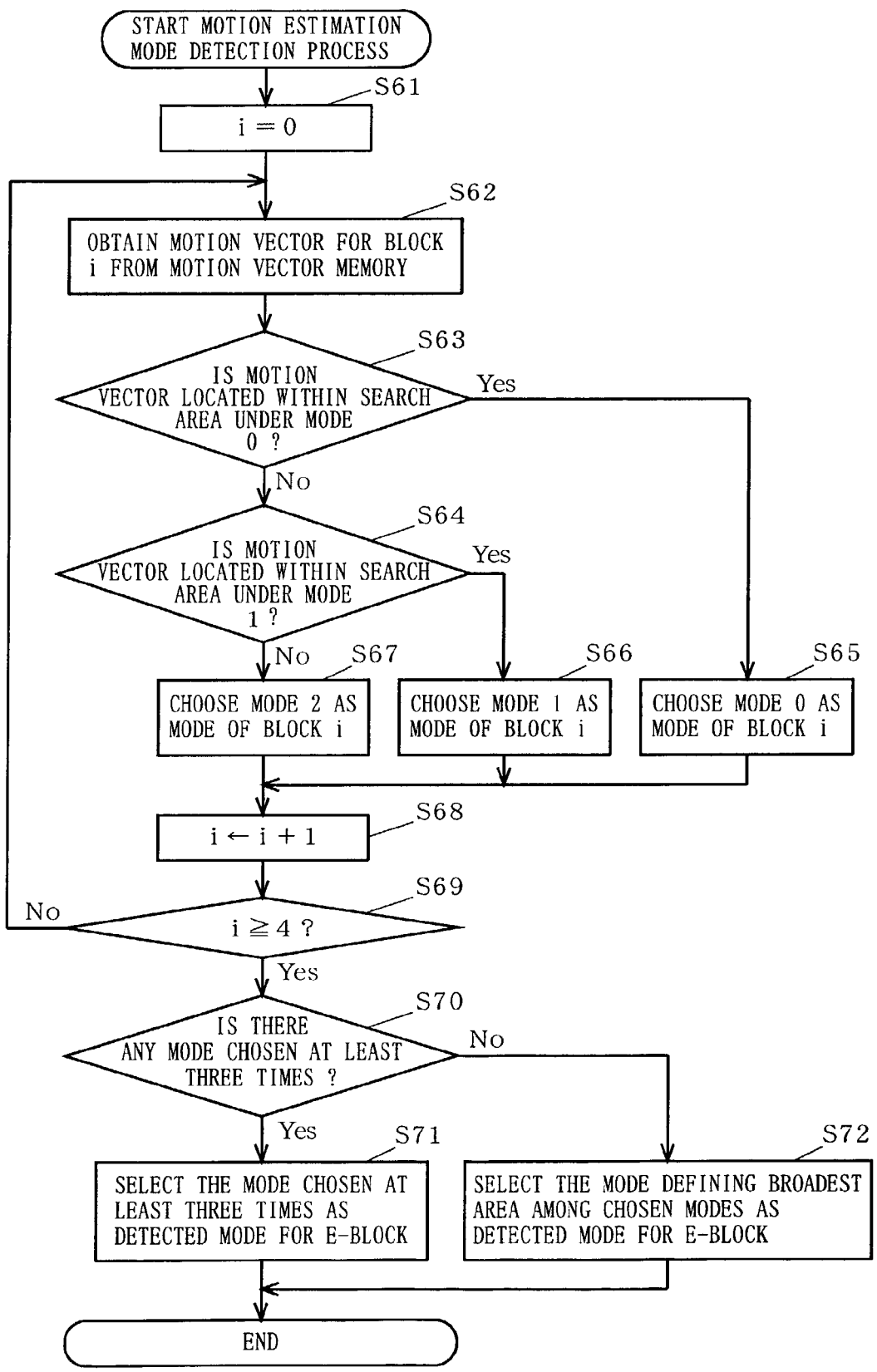
FIG. 7 is a flowchart illustrating the procedure of a motion estimation mode detection process performed by the motion estimation mode detection section 105.

Then, by employing the motion vectors for blocks 0 to 3, the motion estimation mode detection section 105 predicts the amount of motion in the target E-block, and determines a motion estimation mode in accordance with a procedure shown in FIG. 7.

Referring to FIG. 7, the motion estimation mode detection section 105 determines a motion estimation mode for each of blocks 0 to 3 (step S61, S68, S69). First, in accordance with the addresses as managed by the address management section 103, the motion estimation mode detection section 105 obtains a motion vector MV(x,y) for a block i(i=0 to 3) from the motion vector memory 104 (step S62). Next, the motion estimation mode detection section 105 determines which motion estimation mode will enable detection of a motion corresponding to the obtained motion vector MV(x, y) (step S63, S64). At this time, the motion estimation mode detection section 105 determines whether or not the horizontal direction component x of the motion vector MV(x,y) is within the horizontal dimension of the search area and whether or not the vertical direction component y is within the vertical dimension of the search area, thereby ascertaining a motion estimation mode for the block i. Specifically, if both the horizontal direction component x and the vertical direction component y of the motion vector MV(x,y) are found to be within the search area defined under mode 0, mode 0 is chosen (step S65). If they are found to be within the search area defined under mode 1, mode 1 is chosen (step S66). If they are found not to be within the search area defined under mode 1, then mode 2 is chosen (step S67).

In the processing for a target E-block which is positioned at the boundary of a frame to be encoded, a predetermined mode (e.g., mode 1 as an intermediate mode) is prescribed as the default value for any block with respect to which a motion vector MV(x,y) cannot be obtained (i.e., any block lying outside the frame to be encoded).

Thereafter, the motion estimation mode detection section 105 determines whether or not any motion estimation mode has been chosen for three or more of blocks 0 to 3 (step S70). If there is any such motion estimation mode, that mode is determined as the motion estimation mode for the target E-block (step S71). If there is no such motion estimation mode, the mode which defines the broadest search area is determined as the motion estimation mode for the target E-block (step S72).

For example, if the motion estimation modes for blocks 0 to 3 are mode 1, mode 1, mode 2, and mode 1, respectively, then the motion estimation mode is determined to be mode 1. On the other hand, if the motion estimation modes for blocks 0 to 3 are mode 0, mode 1, mode 2, and mode 1, respectively, then the motion estimation mode is determined to be mode 2.

Next, the E-block data extraction section 108 receives the pixel data of the target E-block from the block division section 102, and the motion estimation mode determined by the motion estimation mode detection section 105, and extracts only the pixel data conforming to the motion estimation mode from all pixel data of the target E-block.

Figure 8:
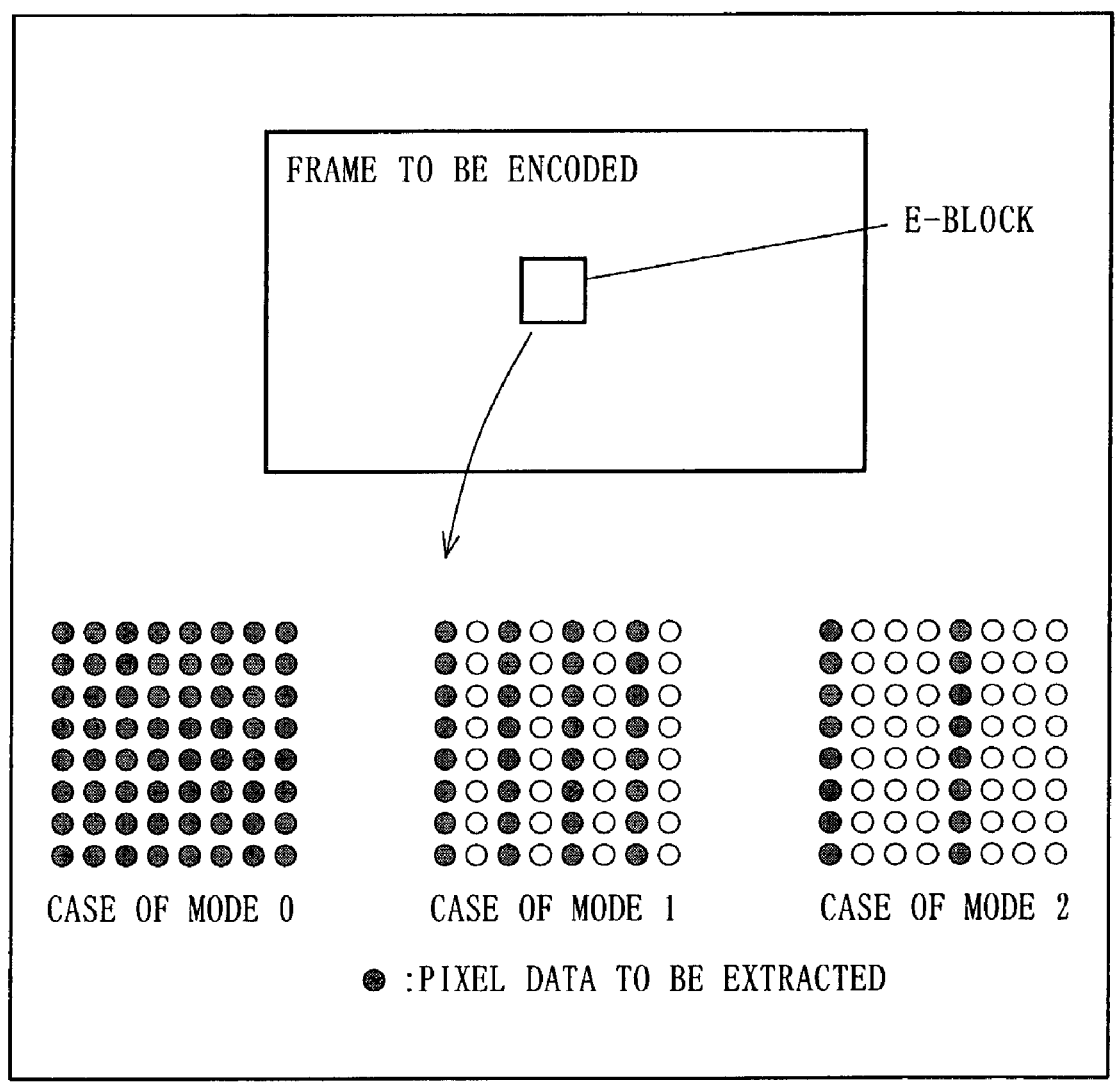
FIG. 8 is a diagram illustrating pixel data of a target E-block which is extracted by an E-block data extraction section 108 under various motion estimation modes.

For example, referring to FIG. 8, if the motion estimation mode is mode 0, the E-block data extraction section 108 extracts all pixel data (8×8 pixels) in the target E-block. If the motion estimation mode is mode 1, the E-block data extraction section 108 extracts pixel data (4×8 pixels) from the pixel data of the target E-block through decimation, by taking every other pixel along the horizontal direction (i.e., one pixel in every horizontal group of two is discarded). If the motion estimation mode is mode 2, the E-block data extraction section 108 extracts pixel data (2×8 pixels) from the pixel data of the target E-block through decimation, by taking every fourth pixel along the horizontal direction (i.e., three pixels in every horizontal group of four are discarded). For comparison, in all of the motion estimation modes shown in FIGS. 4A to 4C, all pixel data in the target E-block is extracted.

The reference data extraction section 107 retrieves pixel data of a predetermined reference frame (to be used for encoding frames to be encoded) from the reference frame memory 106, position information of the target E-block from the address management section 103, the motion estimation mode which has been determined as described above from the motion estimation mode detection section 105. Then, based on the position information of the target E-block, the reference data extraction section 107 identifies a block within the reference frame which is at the same position as the target E-block as an origin block of a search area. The reference data extraction section 107 sets a search area according to the motion estimation mode, which is centered around the origin block of the search area, and extracts pixel data conforming to the motion estimation mode from the search area.

Figure 9:
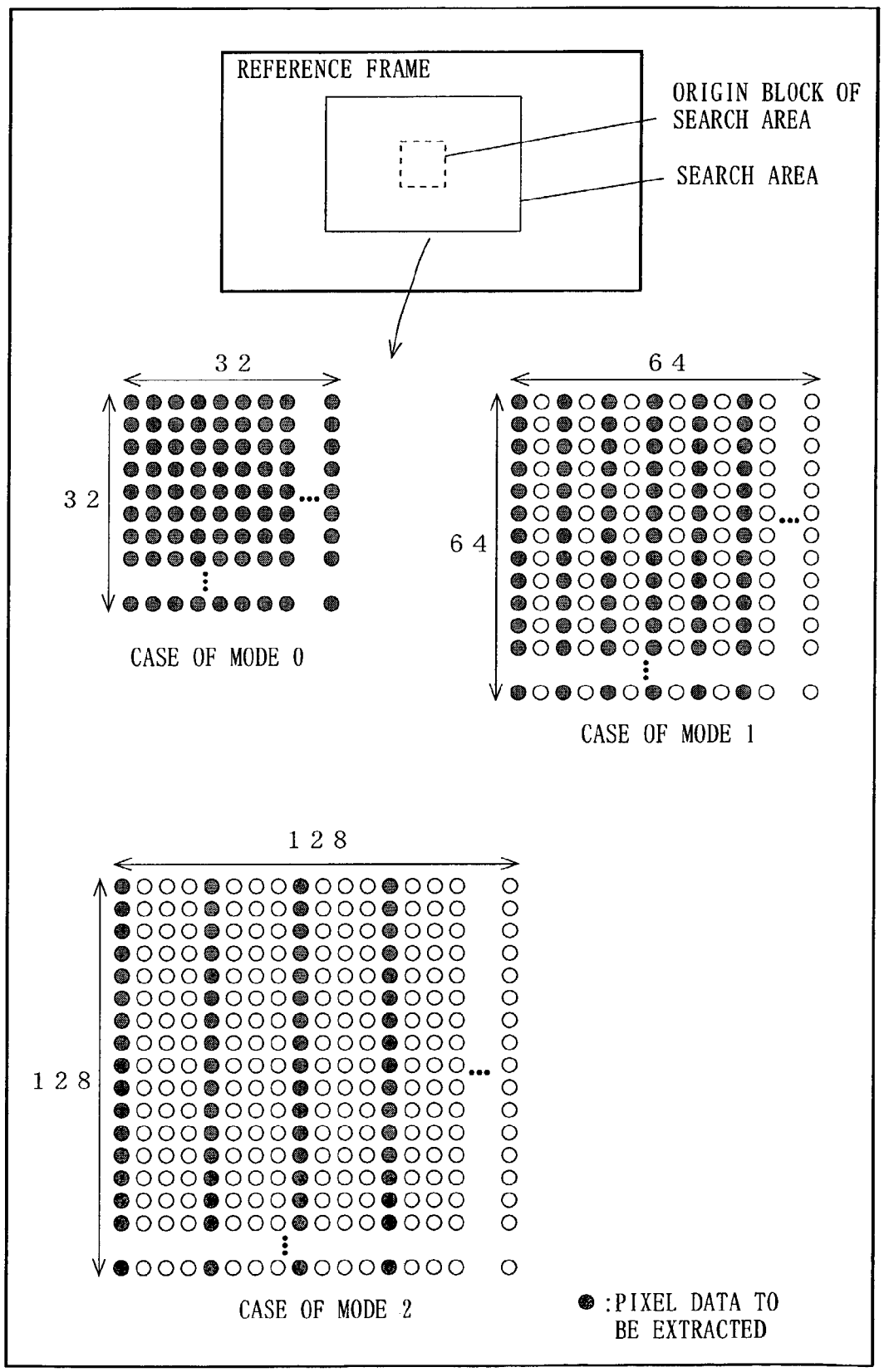
FIG. 9 is a diagram illustrating pixel data in a reference frame which is extracted by a reference data extraction section 107 under various motion estimation modes.

For example, referring to FIG. 9, if the motion estimation mode is mode 0, the reference data extraction section 107 extracts all pixel data (32×32 pixels) in the search area within the reference frame. If the motion estimation mode is mode 1, the reference data extraction section 107 extracts pixel data (32×64 pixels) from the search area within the reference frame through decimation, by taking every other pixel along the horizontal direction (i.e., one pixel in every horizontal group of two is discarded). If the motion estimation mode is mode 2, the reference data extraction section 107 extracts pixel data (32×128 pixels) from the search area within the reference frame by taking every fourth pixel along the horizontal direction (i.e., three pixels in every horizontal group of four are discarded).

Alternatively, the method and apparatus according to the present invention may be arranged so that also in the case where the motion estimation mode is mode 1 or mode 2 (where pixels are decimated), the reference data extraction section 107 extracts all pixel data (64×64 pixels or 128×128 pixels) from the search area within the reference frame. This results in a higher detection accuracy although the amount of computation in mode 1 and mode 2 becomes twice and four times as much, respectively, as that in mode 0. For comparison, in the motion estimation modes shown in FIGS. 4A to 4C, all pixel data in the search area within the reference frame is extracted.

Next, the SAD calculation section 109 receives the pixel data from within the target E-block, which has been extracted by the E-block data extraction section 108, and pixel data from within the search area, which has been extracted by the reference data extraction section 107. Then, the SAD calculation section 109 calculates SADs in pixel data between a plurality of S-blocks each having the same size as that of the target E-block demarcated in the search area and the target E-block.

Figure 10A:
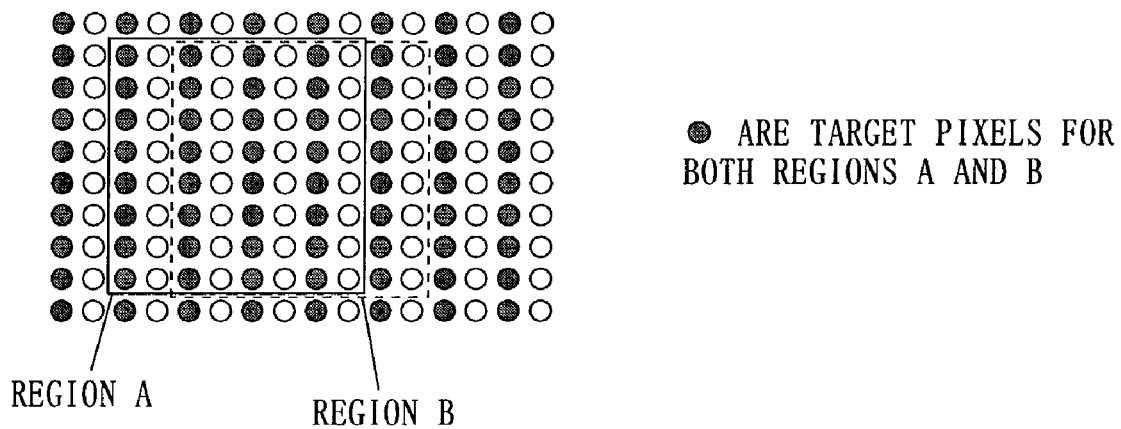
FIGS. 10A and 10B show how regions may be demarcated in the case where the motion estimation mode is mode 1.
Figure 10B:
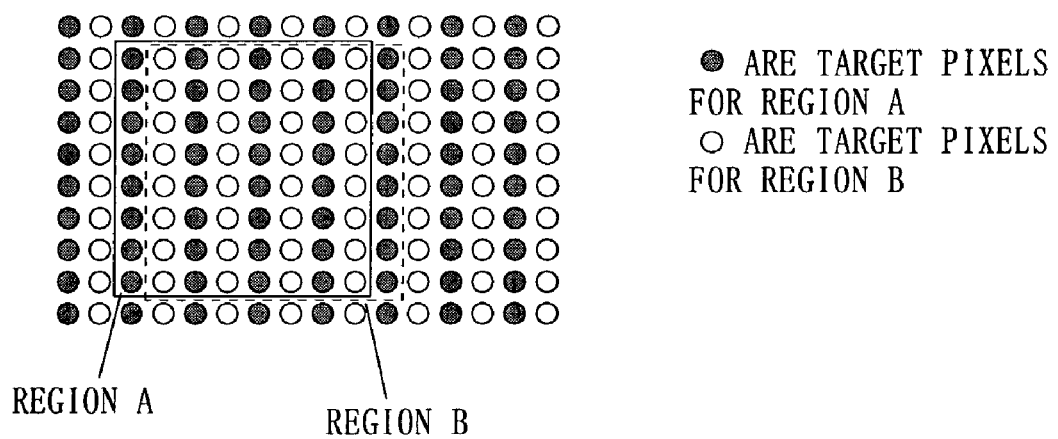

FIG. 10A shows how S-blocks may be demarcated in the case where the motion estimation mode is mode 1. As shown in FIG. 10A, by demarcating S-blocks in accordance with the intervals of pixel data extracted from within the search area in the reference frame (i.e., every other pixel), it becomes possible to achieve the motion estimation processes in mode 0, mode 1, and mode 2 with the same amount of computation (and hence the same circuit scale). In the case where all pixel data is extracted from within the search area in the reference frame, S-blocks may be demarcated as shown in FIG. 10B so that all pixel data is targeted, whereby an improved detection accuracy can be provided at the cost of an increased amount of computation.

Next, the error comparison section 110 compares the SADs between the target E-block and the respective S-blocks as calculated by the SAD calculation section 109, and detects the S-block having the smallest SAD (i.e., the smallest deviation relative to the target E-block) as a correlated block, i.e., a block having the strongest correlation with the target E-block.

The motion vector generation section 111 calculates a temporal/spatial offset between the correlated block as detected by the error comparison section 110 and the target E-block, and outputs this to the motion vector memory 104 as a motion vector.

The motion vector memory 104 stores the motion vector which is outputted from the motion vector generation section 111.

The above processes are performed with respect to all (n) of the E-blocks into which the frame to be encoded is divided, in the order of addresses (1 to n) as managed by the address management section 103.

As described above, the method and apparatus of motion vector detection according to the first embodiment of the present invention makes use of motion estimation modes each defining a plurality of search areas, or a plurality of search areas and a search resolution. One of the motion estimation modes which enables detection of a predicted amount of motion in the E-block is selected in order to perform a motion estimation for the E-block. As a result, a motion estimation having an improved accuracy according to each individual E-block can be realized.

By employing previously-obtained motion vector information concerning blocks, the amount of motion in an E-block is predicted before encoding, and a search area which is in accordance with the prediction is secured. As a result, even if the motion of an object in the image undergoes a drastic change, a motion estimation mode which is in accordance with that motion can be quickly selected.

Furthermore, since motion vector information concerning blocks in the same frame to be encoded is used when predicting the amount of motion in the E-block, the capacity of the motion vector memory 104 can be minimized.

Second Embodiment

The first embodiment describes a technique in which the motion estimation mode detection section 105 predicts an amount of motion in a target E-block based on E-blocks (blocks 0 to 3) within the frame to be encoded for which motion vectors have already been obtained.

A second embodiment of the present invention illustrates a technique in which an amount of motion in a target E-block is predicted based on blocks in a reference frame.

The structure of the motion vector detection apparatus according to the second embodiment is identical to the structure of the motion vector detection apparatus according to the first embodiment as shown in FIG. 2, although the motion estimation mode detection section 105 performs a different process. The motion estimation mode detection section 105, functioning to perform this different process, will conveniently be denoted as a "motion estimation mode detection section 205" in the present embodiment, and the differences from the first embodiment will be described below.

For each target E-block, the motion estimation mode detection section 205 retrieves the position of the target E-block within the frame to be encoded from the address management section 103, and past motion vectors in a predetermined block associated with that position from the motion vector memory 104, and predicts the amount of motion in the target E-block. Then, from among a plurality of predetermined motion estimation modes, the motion estimation mode detection section 205 determines a motion estimation mode which defines a search area that will enable the detection of the predicted amount of motion, and outputs the motion estimation mode to the reference data extraction section 107 and the E-block data extraction section 108. The motion estimation modes which are predefined in the motion estimation mode detection section 205 are as described above (see FIGS. 5A to 5C).

Figure 11:
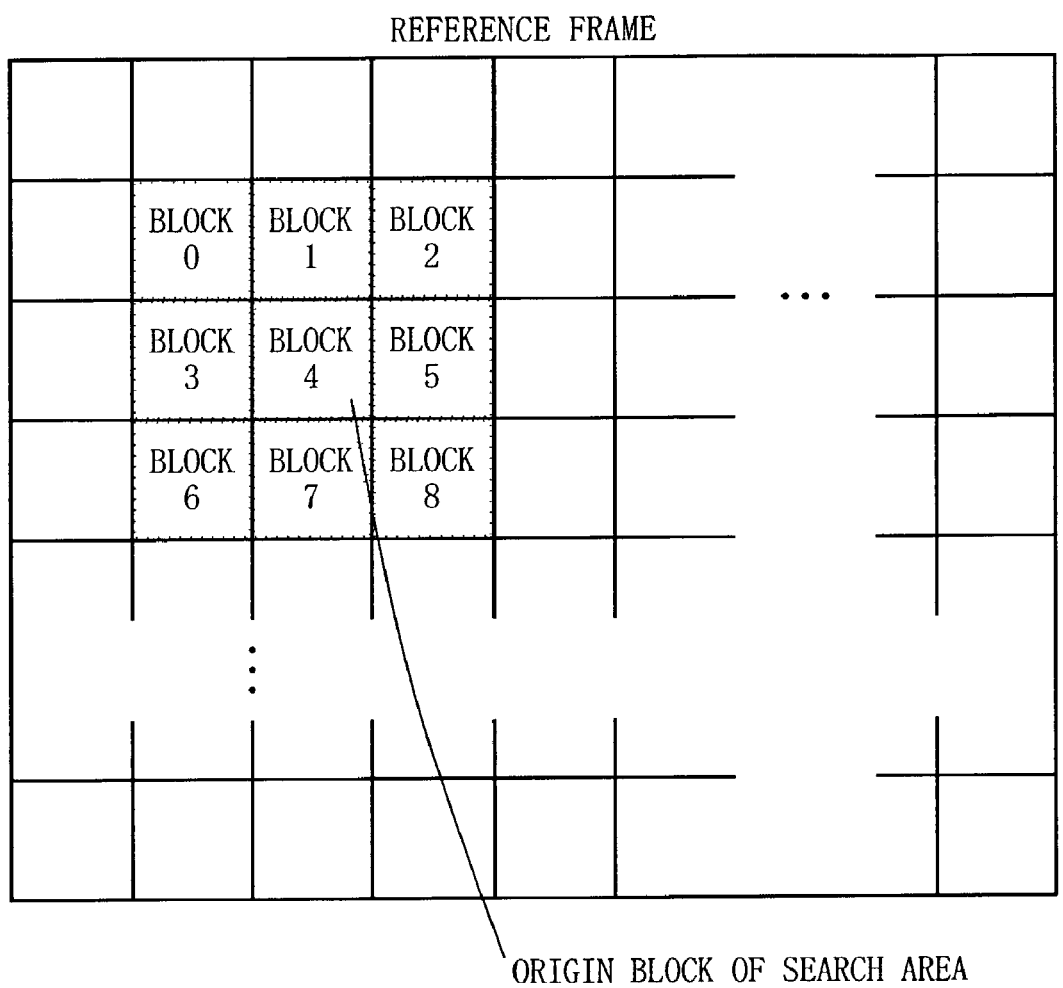
FIG. 11 is a diagram illustrating blocks referred to by a motion estimation mode detection section 205 in predicting an amount of motion in a target E-block.

FIG. 11 is a diagram illustrating blocks referred to by the motion estimation mode detection section 205 in predicting an amount of motion in a target E-block. As shown in FIG. 11, the motion estimation mode detection section 205 refers to a total of nine blocks (blocks 0 to 8): a block (origin block of a search area) in a reference frame that is at a position corresponding to a target E-block; and eight adjoining blocks (i.e., upper, lower, right, left, and diagonally adjoining blocks). As for any E-block for which it is impossible to rely on all or some of such adjoining blocks 0 to 8, e.g., E-block at address "1", a process using a default value as described later will be performed.

Figure 12:
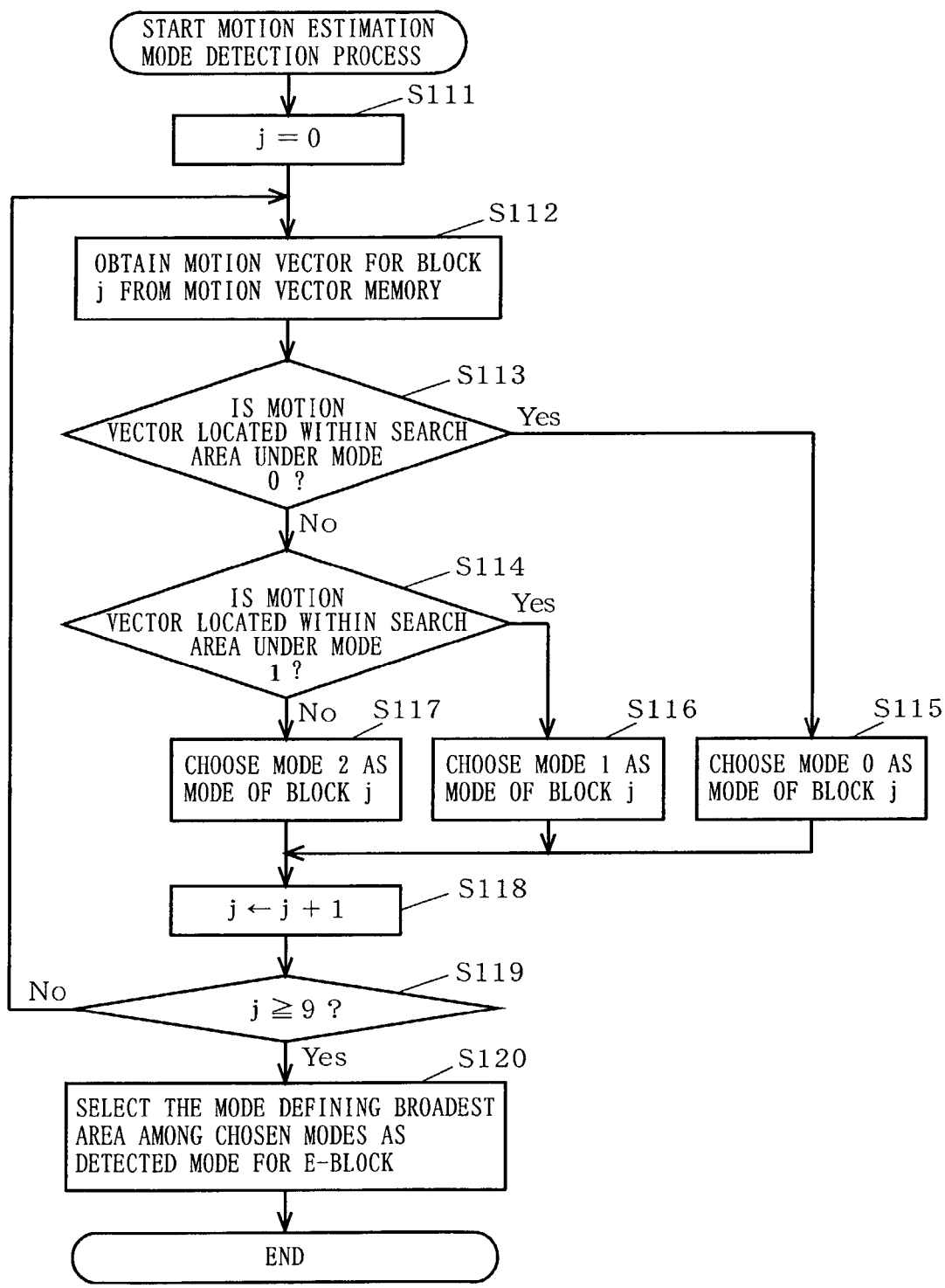
FIG. 12 is a flowchart illustrating the procedure of a motion estimation mode detection process performed by the motion estimation mode detection section 205.

Then, by employing the motion vectors for blocks 0 to 8, the motion estimation mode detection section 205 predicts the amount of motion in the target E-block, and determines a motion estimation mode in accordance with a procedure shown in FIG. 12.

Referring to FIG. 12, the motion estimation mode detection section 205 determines a motion estimation mode for each of blocks 0 to 8 (step S111, S118, S119). First, in accordance with the addresses as managed by the address management section 103, the motion estimation mode detection section 205 obtains a motion vector MV(x,y) for a block j(j=0 to 8) from the motion vector memory 104 (step S112). Next, the motion estimation mode detection section 205 determines which motion estimation mode will enable detection of a motion corresponding to the obtained motion vector MV(x,y) (step S113, S114). At this time, the motion estimation mode detection section 205 determines whether or not the horizontal direction component x of the motion vector MV(x,y) is within the horizontal dimension of the search area and whether or not the vertical direction component y is within the vertical dimension of the search area, thereby ascertaining a motion estimation mode for the block j. Specifically, if both the horizontal direction component x and the vertical direction component y of the motion vector MV(x,y) are found to be within the search area defined under mode 0, mode 0 is chosen (step S115). If they are found to be within the search area defined under mode 1, mode 1 is chosen (step S116). If they are found not to be within the search area defined under mode 1, then mode 2 is chosen (step S117).

In the processing for a target E-block which is positioned at the boundary of a frame to be encoded, a predetermined mode (e.g., mode 1 as an intermediate mode) is prescribed as the default value for any block with respect to which a motion vector MV(x,y) cannot be obtained (i.e., any block lying outside the frame to be encoded).

Thereafter, among the motion estimation modes chosen for blocks 0 to 8, the motion estimation mode detection section 205 determines the mode which defines the broadest search area as the motion estimation mode for the target E-block (step S120).

As described above, the method and apparatus of motion vector detection according to the second embodiment of the present invention makes use of motion estimation modes each defining a plurality of search areas, or a plurality of search areas and a search resolution. One of the motion estimation modes which enables detection of a predicted amount of motion in the E-block is selected in order to perform a motion estimation for the E-block. As a result, a motion estimation having an improved accuracy according to each individual E-block can be realized.

By employing previously-obtained motion vector information concerning blocks, the amount of motion in an E-block is predicted before encoding, and a search area which is in accordance with the prediction is secured. As a result, even if the motion of an object in the image undergoes a drastic change, a motion estimation mode which is in accordance with that motion can be quickly selected.

Furthermore, since motion vector information concerning a block within the reference frame which is selected at the same position as that of the E-block as well as the surrounding blocks thereof is used when predicting the amount of motion in the E-block, the amount of motion in the E-block can be accurately predicted.

Third Embodiment

The first and second embodiments describe a technique in which the motion estimation mode detection section 105 predicts an amount of motion in a target E-block based either on E-blocks (blocks 0 to 6) within the frame to be encoded for which motion vectors have already been obtained or on blocks within a reference frame.

A third embodiment of the present invention illustrates a technique in which an amount of motion in a target E-block is predicted based on both E-blocks within the frame to be encoded and blocks within a reference frame.

The structure of the motion vector detection apparatus according to the third embodiment is identical to the structure of the motion vector detection apparatus according to the first embodiment as shown in FIG. 2, although the motion estimation mode detection section 105 performs a different process. The motion estimation mode detection section 105, functioning to perform this different process, will conveniently be denoted as a "motion estimation mode detection section 305" in the present embodiment, and the differences from the first embodiment will be described below.

For each target E-block, the motion estimation mode detection section 305 retrieves the position of the target E-block within the frame to be encoded from the address management section 103, and past motion vectors in a predetermined block associated with that position from the motion vector memory 104, and predicts the amount of motion in the target E-block. Then, from among a plurality of predetermined motion estimation modes, the motion estimation mode detection section 305 determines a motion estimation mode which defines a search area that will enable the detection of the predicted amount of motion, and outputs the motion estimation mode to the reference data extraction section 107 and the E-block data extraction section 108. The motion estimation modes which are predefined in the motion estimation mode detection section 305 are as described above (see FIGS. 5A to 5C).

The blocks referred to by the motion estimation mode detection section 305 in predicting an amount of motion in a target E-block are: four adjoining blocks (blocks 0 to 3; see FIG. 6) in the frame to be encoded, i.e., upper-left, upper, upper-right, and left adjoining blocks of the target E-block; and nine blocks (blocks 0 to 8; see FIG. 11) including a origin block of a search area in a reference frame and eight adjoining blocks (i.e., upper, lower, right, left, and diagonally adjoining blocks).

Figure 13:
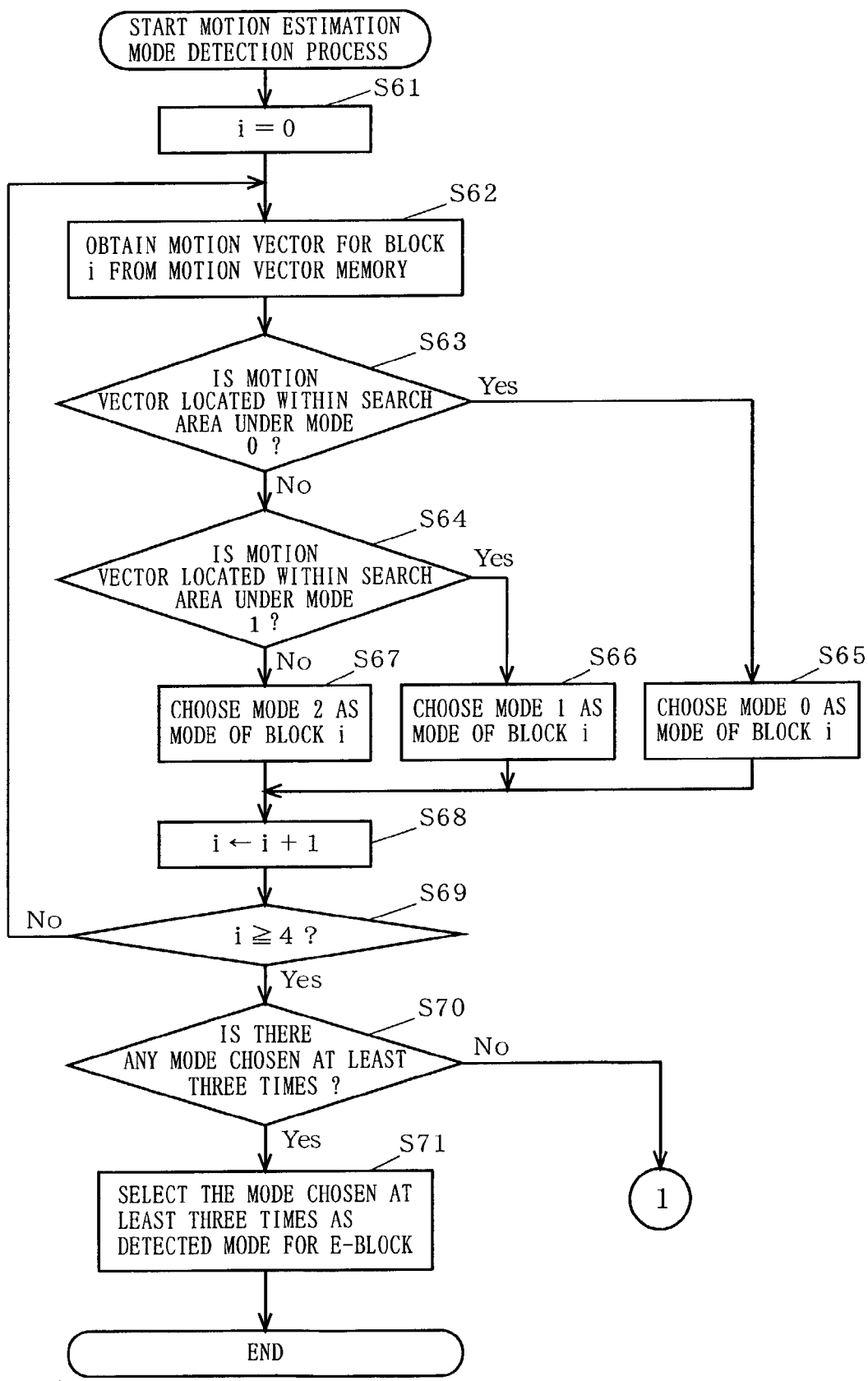
FIGS. 13 and 14 are flowcharts illustrating the procedure of a motion estimation mode detection process performed by a motion estimation mode detection section 305.
Figure 14:
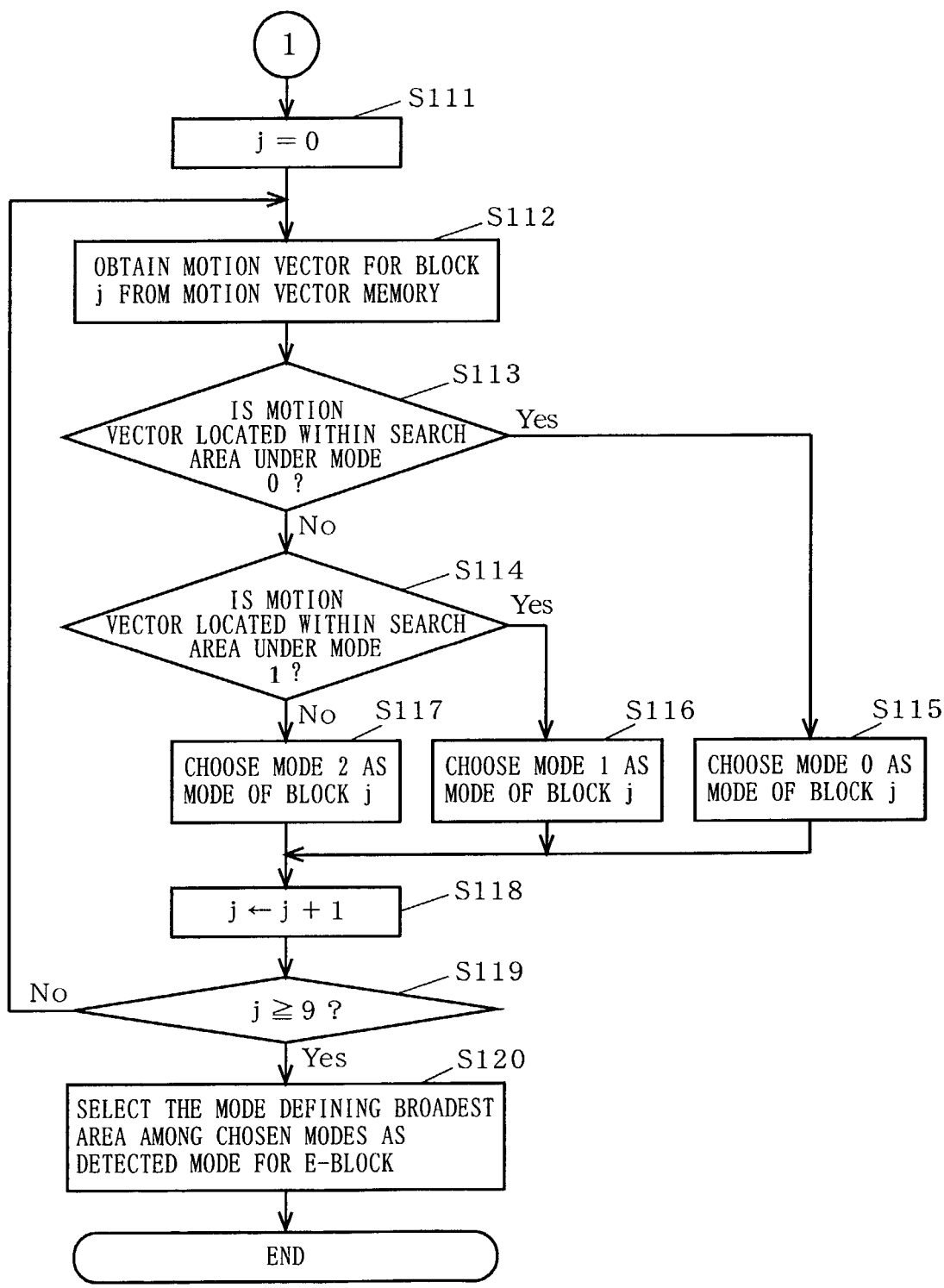

Then, by employing the motion vectors for the respective blocks, the motion estimation mode detection section 305 predicts the amount of motion in the target E-block, and determines a motion estimation mode in accordance with procedures shown in FIGS. 13 and 14.

Referring to FIG. 13, the motion estimation mode detection section 305 determines a motion estimation mode for each of blocks 0 to 3 in the frame to be encoded (step S61, S68, S69). First, in accordance with the addresses as managed by the address management section 103, the motion estimation mode detection section 305 obtains a motion vector MV(x,y) for a block i(i=0 to 3) from the motion vector memory 104 (step S62). Next, the motion estimation mode detection section 305 determines which motion estimation mode will enable detection of a motion corresponding to the obtained motion vector MV(x,y) (step S63, S64). Specifically, if both the horizontal direction component x and the vertical direction component y of the motion vector MV(x,y) are found to be within the search area defined under mode 0, mode 0 is chosen (step S65). If they are found to be within the search area defined under mode 1, mode 1 is chosen (step S66). If they are found not to be within the search area defined under mode 1, then mode 2 is chosen (step S67).

Thereafter, the motion estimation mode detection section 305 determines whether or not any motion estimation mode has been chosen for three or more of blocks 0 to 3 (step S70). If there is any such motion estimation mode, that mode is determined as the motion estimation mode for the target E-block (step S71). If there is no such motion estimation mode, the motion estimation mode detection section 305 determines a motion estimation mode for each of blocks 0 to 8 in the reference frame (step S111, S118, S119).

Referring to FIG. 14, first, in accordance with the addresses as managed by the address management section 103, the motion estimation mode detection section 305 obtains a motion vector MV(x,y) for a block j(j=0 to 8) from the motion vector memory 104 (step S112). Next, the motion estimation mode detection section 305 determines which motion estimation mode will enable detection of a motion corresponding to the obtained motion vector MV(x,y) (step S113, S114). Specifically, if both the horizontal direction component x and the vertical direction component y of the motion vector MV(x,y) are found to be within the search area defined under mode 0, mode 0 is chosen (step S115). If they are found to be within the search area defined under mode 1, mode 1 is chosen (step S116). If they are found not to be within the search area defined under mode 1, then mode 2 is chosen (step S117).

Thereafter, among the motion estimation modes chosen for blocks 0 to 8, the motion estimation mode detection section 305 determines the mode which defines the broadest search area as the motion estimation mode for the target E-block (step S120).

As described above, the method and apparatus of motion vector detection according to the third embodiment of the present invention makes use of motion estimation modes each defining a plurality of search areas, or a plurality of search areas and a search resolution. One of the motion estimation modes which enables detection of a predicted amount of motion in the E-block is selected in order to perform a motion estimation for the E-block. As a result, a motion estimation having an improved accuracy according to each individual E-block can be realized.

By employing a correlation between images along the spatial axis and a correlation between images along the time axis, the amount of motion in an E-block is predicted before encoding, and a search area which is in accordance with the prediction is secured. As a result, even if the motion of an object in the image undergoes a drastic change, a motion estimation mode which is in accordance with that motion can be quickly selected.

Although the first to third embodiments illustrate the case where three motion estimation modes (i.e., modes 0 to 2) define search areas having similar shapes, the present invention is not limited thereto. Even for the same search resolution (i.e., the same extent of decimating the pixels), the shape of the search area may be changed to provide an improved search accuracy. For example, since images are generally likely to contain motions along the horizontal direction, mode 1 may alternatively define a search resolution on the order of every other pixel (i.e., one pixel in every group of two is discarded) and a search area having a longer horizontal dimension than the vertical dimension (e.g., a horizontal dimension of ±64 pixels by a vertical dimension of ±16 pixels). In this case, mode 1 may be preferred to mode 2 for processing an image containing a substantial motion only along the horizontal direction, in order to perform a motion estimation at a higher search resolution.

In the first to third embodiments, the searched pixels are decimated as the size of the search area increases, thus making it possible to secure a search area which is in accordance with the predicted amount of motion in a given E-block for the same amount of computation. However, the present invention is not limited to such settings. Instead of decimating the searched pixels, the pixels which are subjected to computation may be varied when as the size of the search area increases.

The first to third embodiments illustrate a search area (having the same number of pixels along the horizontal and vertical directions) which is centered around an origin block of the search area. However, the present invention is not limited thereto, for example, the center of the search area may be shifted depending on the average value of motion vectors.

Fourth Embodiment

In the first to third embodiments, a motion estimation mode to be applied to a target E-block is determined based on a motion vector MV(x,y) of the block of interest, and an S-block having the smallest SAD is found in the search area defined under that mode. However, depending on the size of the search area under a predefined motion estimation mode, it may be possible that the block having the strongest correlation is not within the search area, thus resulting in an inadequate search.

Accordingly, a fourth embodiment of the present invention will illustrate a technique in which an S-block having the smallest SAD is first found in a search area according to one of the techniques described in the first to third embodiments, and thereafter an OTS technique is optionally performed to determine a correlated block, i.e., a block having the strongest correlation with the target E-block.

Figure 15:
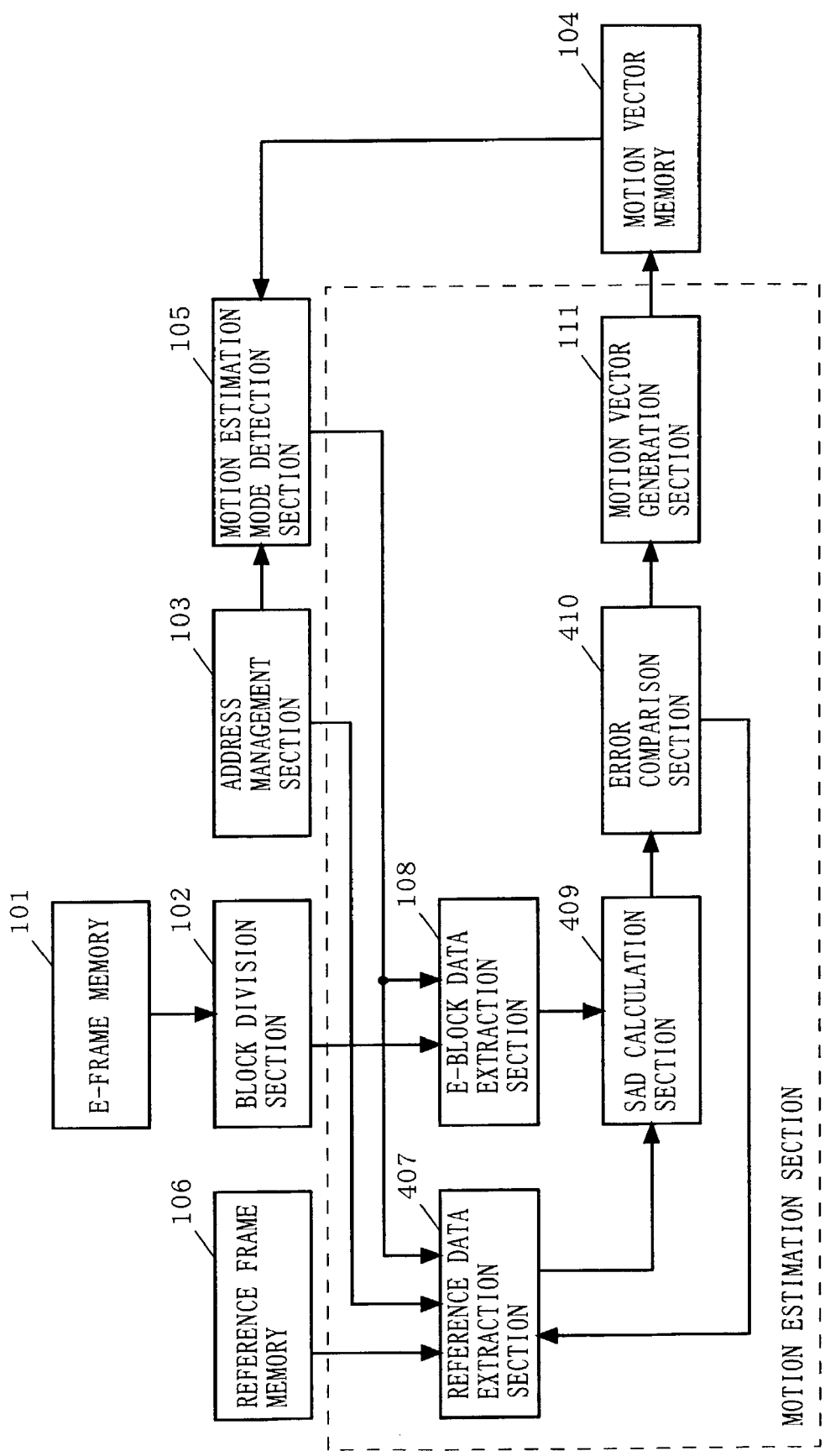
FIG. 15 is a block diagram illustrating the structure of a motion vector detection apparatus according to a fourth embodiment of the present invention.

FIG. 15 is a block diagram illustrating the structure of a motion vector detection apparatus according to a fourth embodiment of the present invention. As shown in FIG. 15, the motion vector detection apparatus according to the fourth embodiment comprises an E-frame memory 101, a block division section 102, an address management section 103, a motion vector memory 104, a motion estimation mode detection section 105, a reference frame memory 106, a reference data extraction section 407, an E-block data extraction section 108, a SAD calculation section 409, an error comparison section 410, and a motion vector generation section 111.

As shown in FIG. 15, the structure of the motion vector detection apparatus according to the fourth embodiment is identical to that of the motion vector detection apparatuses according to the first to third embodiments except for the reference data extraction section 407, the SAD calculation section 409, and the error comparison section 410.

Figure 16:
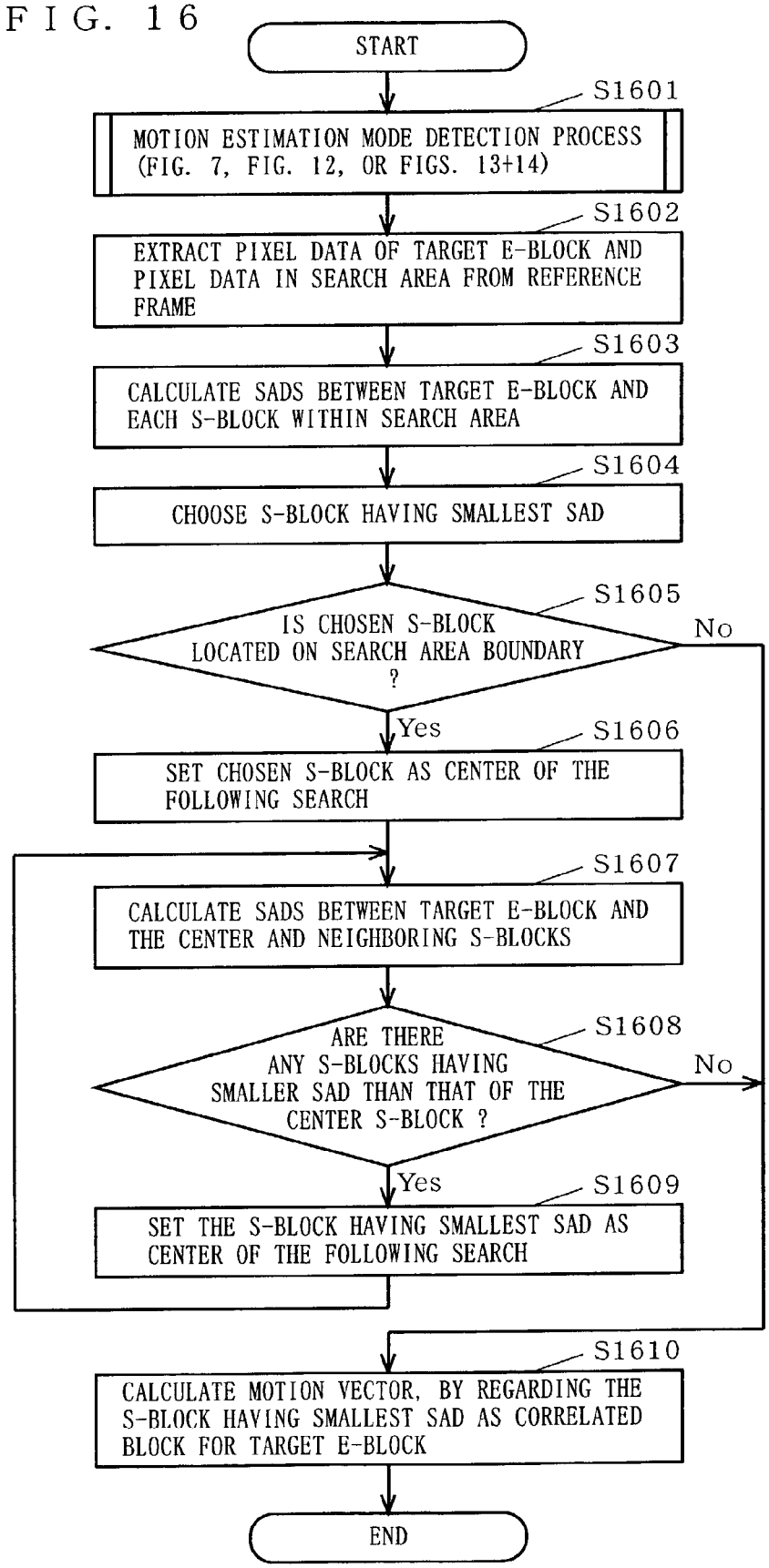
FIG. 16 is a flowchart illustrating the procedure of a motion vector detection process performed in a motion vector detection apparatus according to a fourth embodiment of the present invention.
Figure 17:
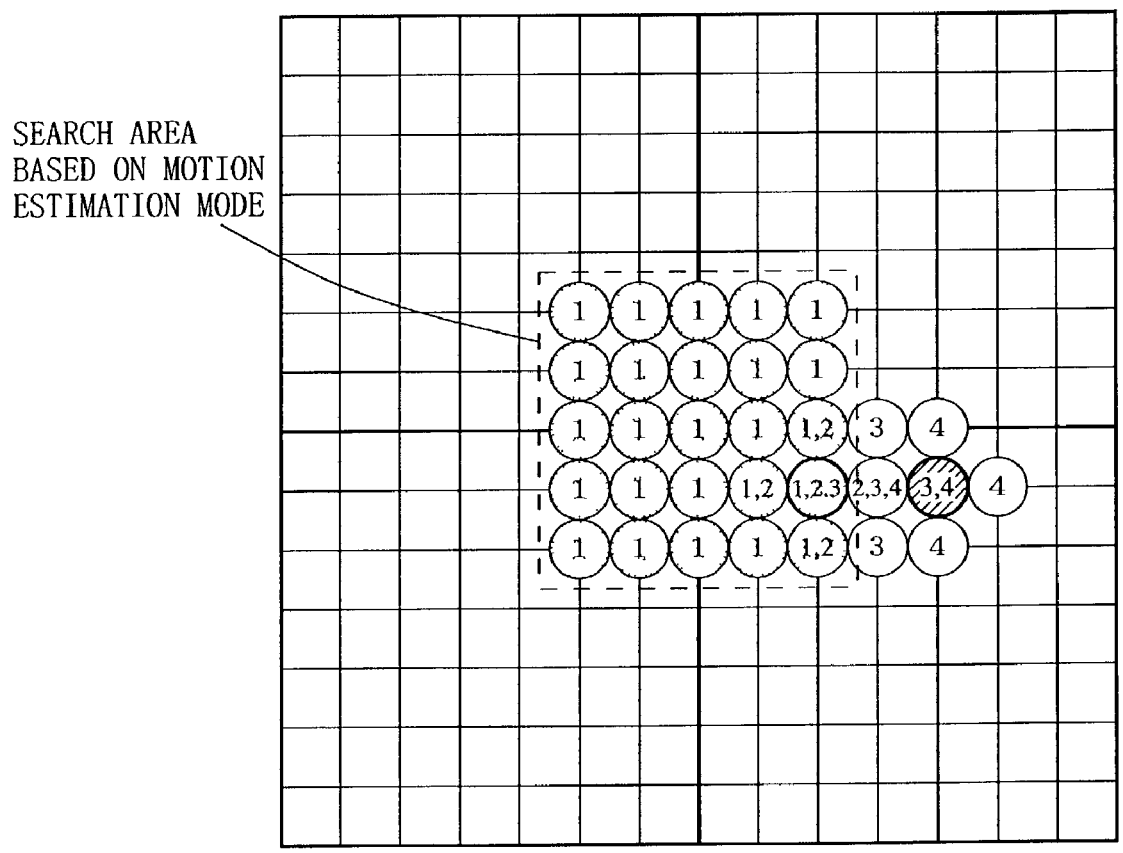
FIG. 17 is a diagram illustrating the concept of the OTS technique which is adopted in the fourth embodiment.

FIG. 16 is a flowchart illustrating the procedure of a motion vector detection process performed in the motion vector detection apparatus according to the fourth embodiment. FIG. 17 is a diagram illustrating the concept of the OTS technique which is adopted in the fourth embodiment. FIG. 17 is a diagram for facilitating the understanding of the OTS technique, where search positions are shown as non-overlapping regions (circles).

Hereinafter, referring to FIGS. 15 to 17, the motion vector detection method performed in the motion vector detection apparatus according to the fourth embodiment will be described, mainly with respect to differences over the first to third embodiments.

A motion estimation mode is determined for a target E-block by the motion estimation mode detection section 105, 205, or 305, based on the respective technique described above (FIG. 7, FIG. 12, or FIGS. 13 and 14) (step S1601). According to the determined motion estimation mode, the E-block data extraction section 108 and the reference data extraction section 407 extract pixel data of the target E-block and pixel data in the search area from the reference frame, respectively (step S1602). The SAD calculation section 409 calculates SADs in pixel data between the S-blocks demarcated in the search area and the target E-block (step S1603). The error comparison section 410 compares the calculated SADs against one another to detect an S-block having the smallest SAD (step S1604). These processes (directed to searches of S-blocks numbered as "1" in FIG. 17) are similar to those described in the first to third embodiments. In the fourth embodiment, the following processes are further performed.

The error comparison section 410 determines whether the detected S-block is located at a border of the search area or not (step S1605). If the detected S-block is determined to be located at a border of the search area, the error comparison section 410 sets this S-block as a central S-block (step S1606), and instructs the reference data extraction section 407 to extract pixel data in this central S-block and four neighboring S-blocks (S-blocks numbered as "2" in FIG. 17). The reference data extraction section 407 extracts pixel data of the central S-block and the four neighboring S-blocks around the central S-block, i.e., the upper, lower, right, and left-adjoining blocks. The SAD calculation section 409 calculates SADs in pixel data between the central S-block or the four neighboring S-blocks and the target E-block (step S1607). The error comparison section 410 compares the calculated SADs against one another to determine whether or not any of the neighboring S-blocks has a smaller SAD than that of the central S-block (step S1608). If it is determined that a neighboring S-block has a smaller SAD, the error comparison section 410 sets this neighboring S-block as a new central S-block (step S1609), and again instructs the reference data extraction section 407 to extract pixel data in the new central S-block and four neighboring S-blocks (S-blocks numbered as "3" and "4" in FIG. 17).

On the other hand, if the detected S-block is not determined to be located at a border of the search area (step S1605, No) or if it is determined that no neighboring S-block has a smaller SAD (step S1608, No), the error comparison section 410 determines the currently-set central S-block as the correlated block for the target E-block, and outputs it to the motion vector generation section 111. The motion vector generation section 111 calculates a temporal/spatial offset between the target E-block and the correlated block determined by the error comparison section 410, and outputs it as a motion vector to the motion vector memory 104 (step S1610).

By retaining the SADs of any already-calculated S-blocks in the SAD calculation section 409, it becomes possible to prevent recalculation of a SAD for the same S-block (e.g., for the S-blocks bearing more than one numeral in FIG. 17).

Thus, the method and apparatus of motion vector detection according to the fourth embodiment of the present invention, a prospectively correlated block is determined in a search area according to the above-described motion estimation mode-based technique, and if this prospectively correlated block is found to be located at a border of the search area, then the OTS technique is employed to determine whether or not any block exists outside the search area that shows a stronger correlation than the prospectively correlated block. As a result, it becomes possible to search for a correlated block for the target E-block in an efficient manner without requiring a large amount of computation.

Although the present embodiment illustrates an example where a search area is detected by procedures shown in FIG. 7, FIG. 12, or FIGS. 13 and 14 before a one-at-a-time search is employed to perform a further search in the case where the detected S-block is located at a border of the search area, it will be appreciated that any other detection method may be employed before the one-at-a-time search.

Fifth Embodiment

A fifth embodiment of the present invention illustrates a useful technique which employs a two-step search method in the case where mode 2 (which defines a search resolution on the order of every fourth pixels, i.e., three pixels in every group of four are discarded) is selected in the process of determining a motion estimation mode in the first to third embodiments.

Figure 18:
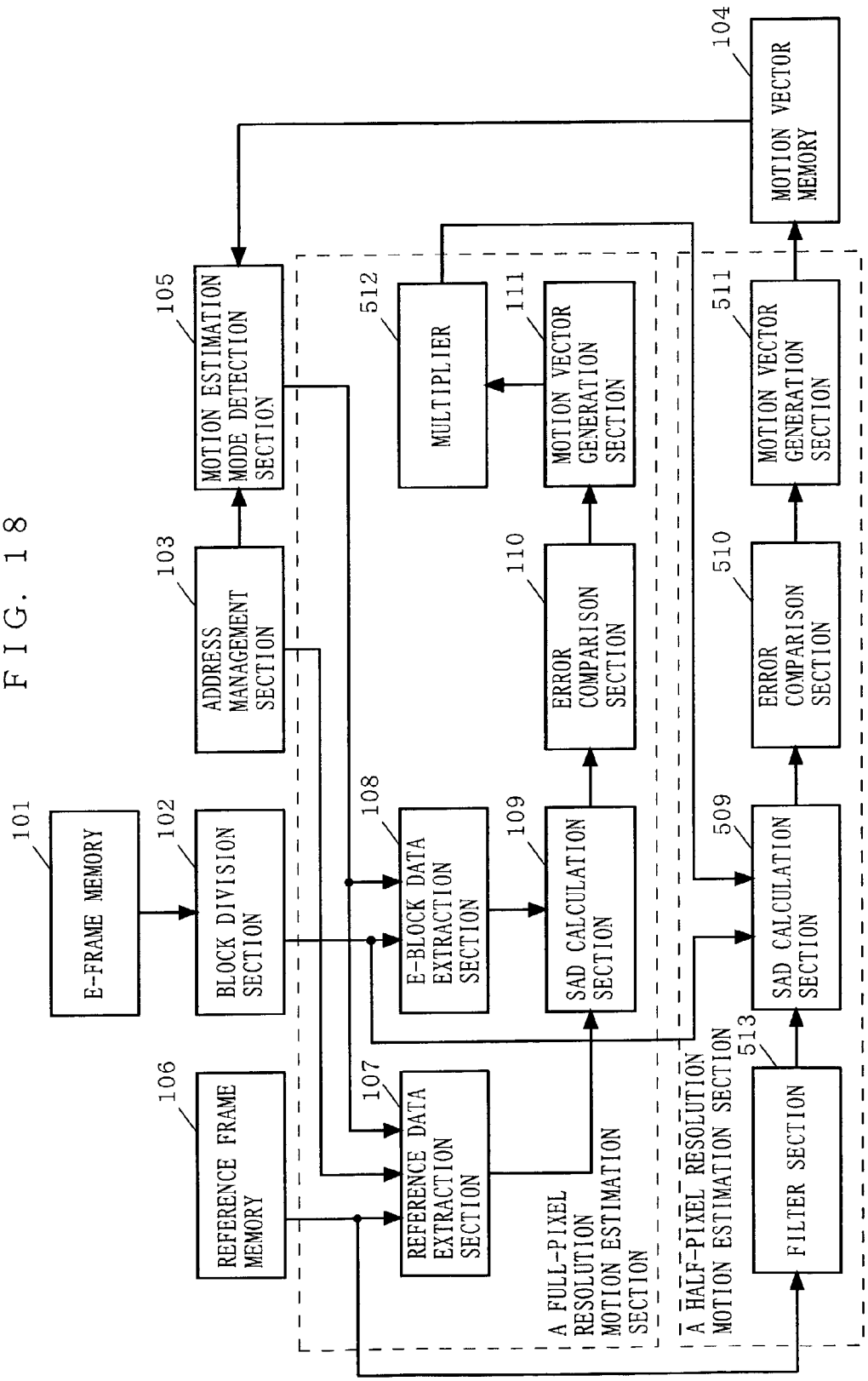
FIG. 18 is a block diagram illustrating the structure of a motion vector detection apparatus according to a fifth embodiment of the present invention.

FIG. 18 is a block diagram illustrating the structure of a motion vector detection apparatus according to a fifth embodiment of the present invention. As shown in FIG. 18, the motion vector detection apparatus according to the fifth embodiment comprises an E-frame memory 101, a block division section 102, an address management section 103, a motion vector memory 104, a motion estimation mode detection section 105, a reference frame memory 106, a reference data extraction section 107, an E-block data extraction section 108, SAD calculation sections 109 and 509, error comparison sections 110 and 510, motion vector generation sections 111 and 511, a multiplier 512, and a filter section 513.

As shown in FIG. 18, the motion vector detection apparatus according to the fifth embodiment includes the SAD calculation section 509, the error comparison section 510, the motion vector generation section 511, the multiplier 512, and the filter section 513 in addition to the component elements of the motion vector detection apparatuses according to the first to third embodiments.

Hereinafter, the motion vector detection method performed in the motion vector detection apparatus according to the fifth embodiment will be described, mainly with respect to differences over the first to third embodiments.

If the motion estimation mode detection section 105 determines the motion estimation mode to be "mode 2", the E-block data extraction section 108 extracts pixel data of the target E-block from the block division section 102 by taking every fourth pixel along the horizontal direction under mode 2. Based on mode 2 and position information of the target E-block obtained from the address management section 103, the reference data extraction section 107 determines a search area in a predetermined reference frame, and extracts pixel data therefrom by taking every fourth pixel along the horizontal direction.

Next, the SAD calculation section 109 receives the extracted pixel data from within the target E-block and the pixel data from within the search area. Then, the SAD calculation section 109 calculates SADs in pixel data between the S-blocks demarcated in the search area and the target E-block. The error comparison section 110 compares the calculated SADs against one another to detect an S-block having the smallest SAD as the correlated block for the target E-block. The motion vector generation section 111 calculates a temporal/spatial offset between the target E-block and the correlated block determined by the error comparison section 110, and outputs it as a motion vector to the multiplier 512.

Since the motion vector calculated by the motion vector generation section 111 has been obtained at a resolution on the order of every fourth pixels (i.e., three pixels in every group of four are discarded), the multiplier 512 multiplies the motion vector by eight. This is because the motion vector which has been obtained by taking every fourth pixel has a ¼ size of the actual motion vector and also because a double-time resolution is needed for the ensuing motion estimation with a half-pixel resolution, thus making it necessary to employ eight times the motion vector as an offset value.

Figure 19:
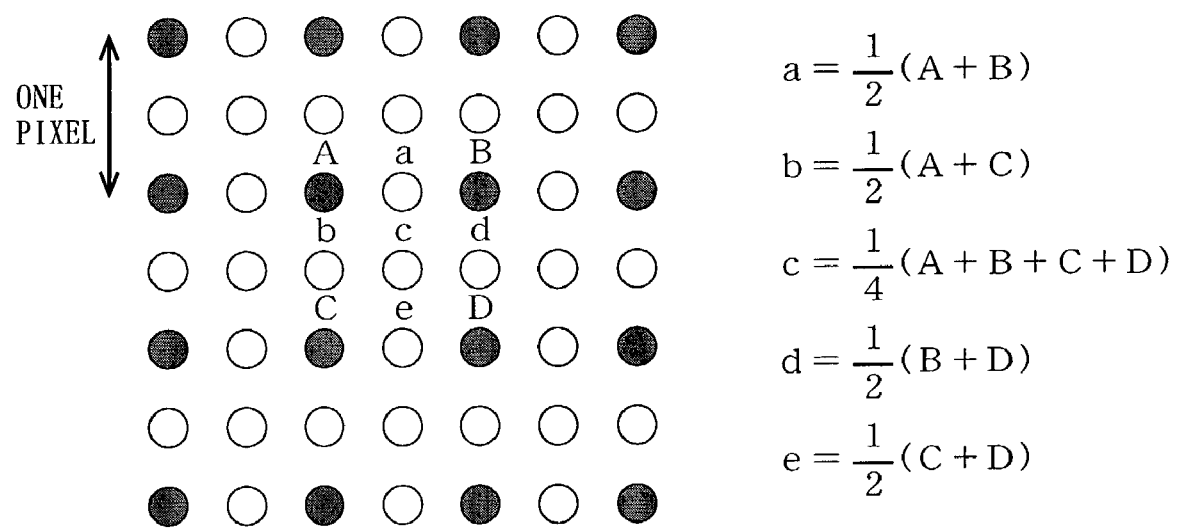
FIG. 19 is a diagram illustrating the concept of an operation performed by a filter section 513.

The filter section 513 oversamples the pixel data of the reference frame as stored in the reference frame memory 106 with respect to both the horizontal and vertical directions. The oversampled pixel data is inputted to the SAD calculation section 509 together with the pixel data of the target E-block outputted from the block division section 102 and the full-pixel resolution motion vector which has been obtained through the multiplication by the multiplier 512. FIG. 19 is a diagram illustrating the concept of the operation performed by the filter section 513. As shown in FIG. 19, the filter section 513 interpolates the inputted pixel data along both the horizontal and vertical directions so as to output pixel data with a half-pixel resolution.

Figure 20:
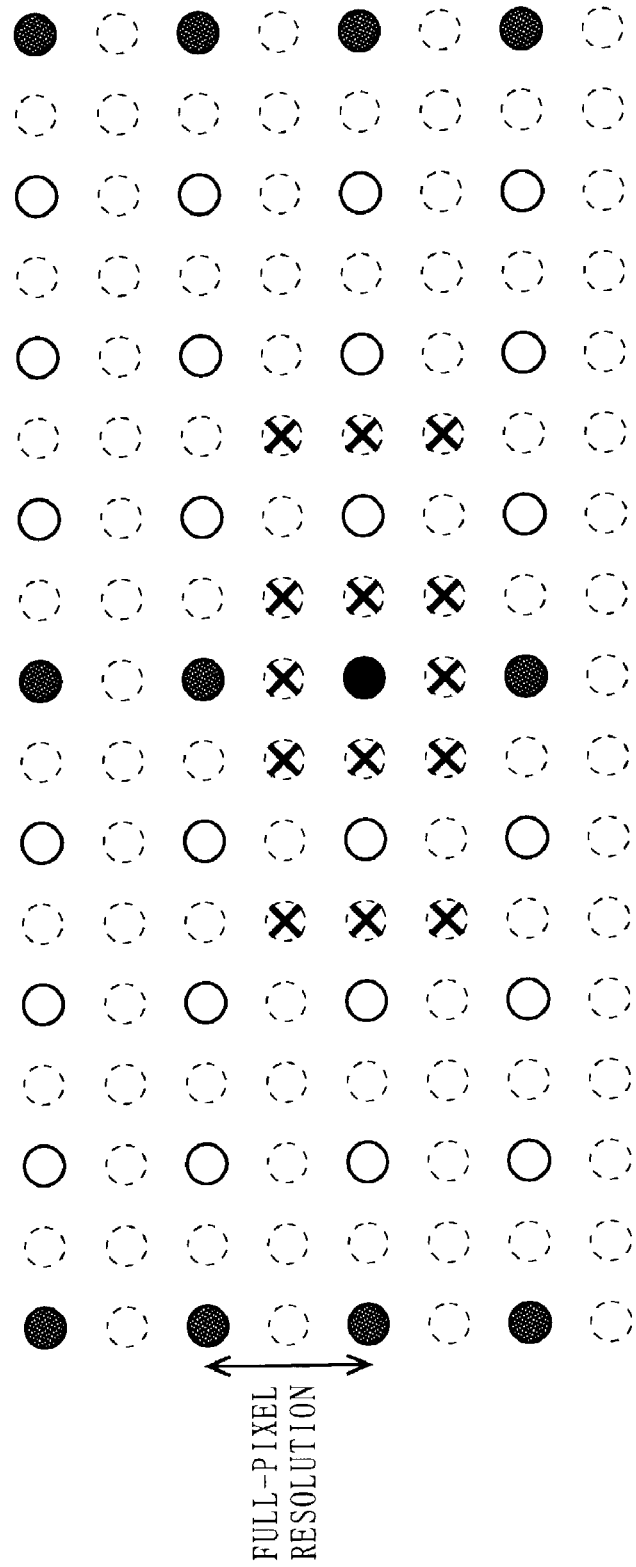
FIG. 20 is a diagram illustrating pixels to be used for the SAD calculation by a SAD calculation section 509.
Figure 22:
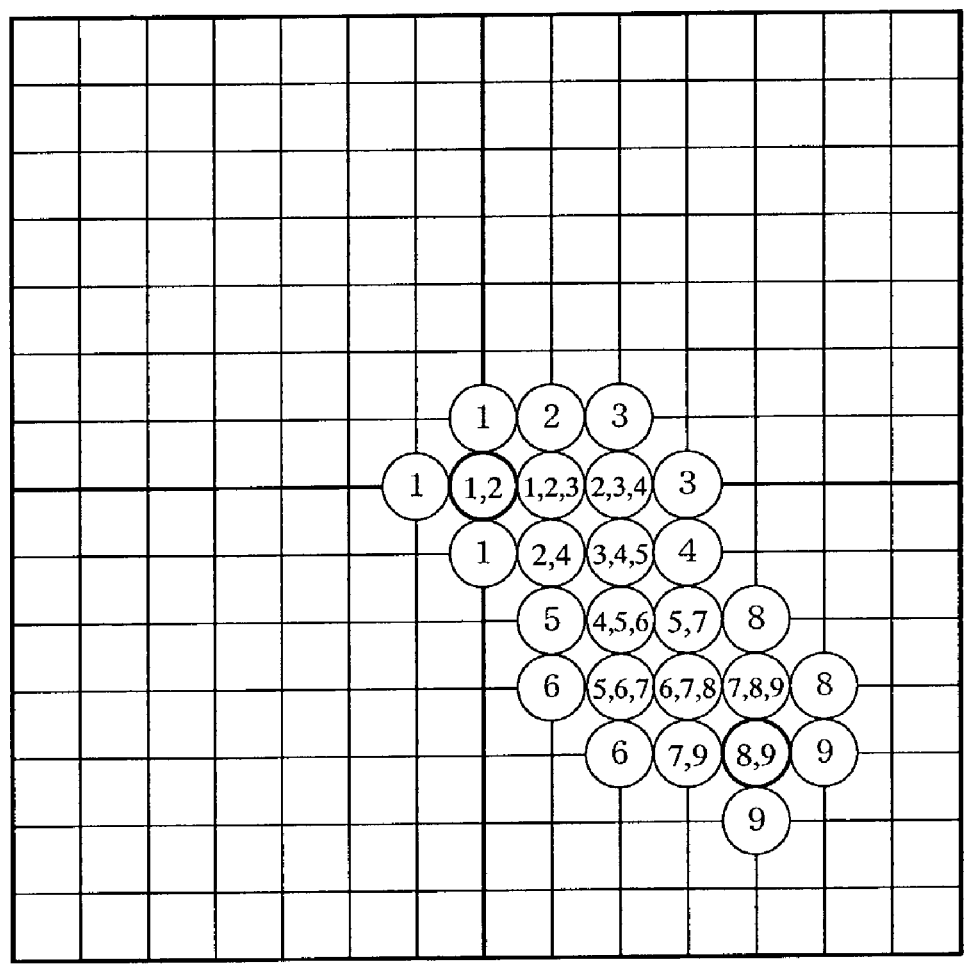
FIG. 22 is a diagram illustrating the concept of a conventional OTS technique.

The SAD calculation section 509 calculate a SAD between the pixel data of the target E-block and the specific pixel data from within the reference frame that has been oversampled. FIG. 20 is a diagram illustrating pixels to be used for the SAD calculation by the SAD calculation section 509. As shown in FIG. 20, in the case where the motion estimation mode is mode 2, the SAD calculation section 509 calculates SADs while ensuring matching with respect to the pixels denoted as X in FIG. 20, which are centered around a pixel position pointed to by the full-pixel resolution motion vector (denoted as ● in FIG. 20).

The error comparison section 510 compares the SADs calculated by the SAD calculation section 509 between the target E-block and the respective S-blocks against one another to detect an S-block having the smallest SAD as the correlated block for the target E-block.

The motion vector generation section 511 calculates a temporal/spatial offset between the target E-block and the correlated block determined by the error comparison section 510, and outputs it as a motion vector to the motion vector memory 104.

The motion vector memory 104 stores the motion vector outputted from the motion vector generation section 511.

Thus, in accordance with the method and apparatus of motion vector detection of the fifth embodiment of the present invention, even in the case where pixels are decimated during a primary search in a motion vector detection apparatus which performs a two-step search, only specific pixels are searched in a secondary search. Thus, by optimizing the searched pixels used for the motion vector detection with a half-pixel resolution, a motion vector can be obtained without inviting an increase in the scale of the circuitry associated with the secondary search, or the same image quality can be maintained while reducing the scale of the circuitry associated with the secondary search.

Although the fifth embodiment illustrates a two-step search in the case where the motion estimation mode selected in the primary search is mode 2 (which defines decimation on the order of every fourth pixels), it will be appreciated that the same principle can be applied to a two-step search in the case where the primary search is any other motion estimation mode, as described in the first to third embodiments above.

Alternatively, the pixels used for the motion estimation in the primary search do not need to be varied depending on motion in the target E-block as illustrated in the first to third embodiments, but may instead be predetermined as in conventional techniques.

Furthermore, although an exemplary case of performing the secondary search in a two-step search with a half-pixel resolution is illustrated, any resolution higher than a full-pixel resolution (e.g., a resolution on the order of 0.25 pixels or a resolution on the order of 0.125 pixels) may be employed. In this case, the factor in the multiplier 512 and the oversampling value in the filter section 513 will be determined in accordance with the pixel resolution used for the secondary search.

Typically, the motion vector detection method illustrated in the first to fifth embodiments is realized as a set of predetermined program data, stored in a storage device (e.g., a ROM, RAM, or hard disk), which is capable of executing the above-described processing procedure, is interpreted and executed by a CPU. In this case, the program data may be introduced into the storage device via a recording medium such as a CD-ROM or a flexible disk before execution, or directly executed on such a recording medium.

While the invention has been described in detail, the foregoing description is in all aspects illustrative and not restrictive. It is understood that numerous other modifications and variations can be devised without departing from the scope of the invention.

What is claimed is:

1. A motion vector detection method for detecting a motion vector in a frame to be encoded which is used in motion-compensated predictive encoding of moving pictures, the method comprising:
   a step of dividing the frame to be encoded into a plurality of E-blocks of a predetermined pixel size;
   a step of predicting an amount of motion in a target E-block to be processed by using a motion vector associated with a block which is encoded before the target E-block;
   a step of determining a search area in a reference frame in accordance with the predicted amount of motion in the target E-block, wherein the reference frame is an already-encoded frame;
   a step of calculating an evaluation index for each of a plurality of S-blocks which are demarcated in the search area determined in the reference frame, the plurality of S-blocks being at a predetermined pixel interval and each having the predetermined pixel size, wherein the evaluation index represents a correlation between the S-block and the target E-block; and
   a step of detecting a motion vector associated with the target E-block in accordance with a temporal/spatial difference between a correlated block and the target E-block, wherein the correlated block is one of the plurality of S-blocks having a highest correlation as determined by comparing a plurality of the evaluation indices against one another,
   wherein the step of determining determines, from among a plurality of predefined motion estimation modes each defining a respectively different search area in the reference frame, a motion estimation mode corresponding to the predicted amount of motion in the target E-block;
   wherein the step of calculating extracts pixel data from within the target E-block and pixel data from within the search area in the reference frame in accordance with the determined motion estimation mode, and calculates a sum of absolute differences in pixel data between the target E-block and each of the plurality of S-blocks as the evaluation index; and
   wherein the step of detecting detects the temporal/spatial offset between the correlated block and the target E-block as the motion vector associated with the target E-block.

2. A motion vector detection method for detecting a motion vector in a frame to be encoded which is used in motion-compensated predictive encoding of moving pictures, the method comprising:
   a step of dividing the frame to be encoded into a plurality of E-blocks of a predetermined pixel size;
   a step of predicting an amount of motion in a target E-block to be processed by using a motion vector associated with a block which is encoded before the target E-block;
   a step of determining a search area in a reference frame in accordance with the predicted amount of motion in the target E-block, wherein the reference frame is an already-encoded frame;
   a step of calculating an evaluation index for each of a plurality of S-blocks which are demarcated in the search area determined in the reference frame, the plurality of S-blocks being at a predetermined pixel interval and each having the predetermined pixel size, wherein the evaluation index represents a correlation between the S-block and the target E-block; and
   a step of detecting a motion vector associated with the target E-block in accordance with a temporal/spatial difference between a correlated block and the target E-block, wherein the correlated block is one of the plurality of S-blocks having a highest correlation as determined by comparing a plurality of the evaluation indices against one another.

wherein the step of determining determines, from among a plurality of predefined motion estimation modes each defining a respectively different search area in the reference frame and a search resolution, a motion estimation mode corresponding to the predicted amount of motion in the target E-block;

wherein the step of calculating extracts pixel data from within the target E-block and pixel data from within the search area in the reference frame in accordance with the determined motion estimation mode, the extracted pixel data being decimated in accordance with the search resolution, and calculates a sum of absolute differences in pixel data between the target E-block and each of the plurality of S-blocks as the evaluation index; and wherein the step of detecting detects the temporal/spatial offset between the correlated block and the target E-block as the motion vector associated with the target E-block.

3. The motion vector detection method according to claim 1, wherein the step of predicting predicts the amount of motion in the target E-block based on a size of the motion vector associated with spatially preceding one or more of the E-blocks in the frame to be encoded, the spatially preceding one or more of the E-blocks having been encoded before the target E-block.

4. The motion vector detection method according to claim 2, wherein the step of predicting predicts the amount of motion in the target E-block based on a size of the motion vector associated with spatially preceding one or more of the E-blocks in the frame to be encoded, the spatially preceding one or more of the E-blocks having been encoded before the target E-block.

5. The motion vector detection method according to claim 1, wherein the step of predicting predicts the amount of motion in the target E-block based on sizes of the motion vectors associated with a spatially identical but temporally preceding E-block in the reference frame and a plurality of E-blocks adjoining the spatially identical but temporally preceding E-block, the spatially identical but temporally preceding E-block having been encoded before the target E-block.

6. The motion vector detection method according to claim 2, wherein the step of predicting predicts the amount of motion in the target E-block based on sizes of the motion vectors associated with a spatially identical but temporally preceding E-block in the reference frame and a plurality of E-blocks adjoining the spatially identical but temporally preceding E-block, the spatially identical but temporally preceding E-block and the adjoining E-blocks having been encoded before the target E-block.

7. The motion vector detection method according to claim 1, wherein the step of predicting predicts the amount of motion in the target E-block based on a size of the motion vector associated with spatially preceding one or more of the E-blocks in the frame to be encoded, and sizes of the motion vectors associated with a spatially identical but temporally preceding E-block in the reference frame and a plurality of E-blocks adjoining the spatially identical but temporally preceding E-block, the spatially preceding one or more of the E-blocks, the spatially identical but temporally preceding E-block, and the adjoining E-blocks having been encoded before the target E-block.

8. The motion vector detection method according to claim 2, wherein the step of predicting predicts the amount of motion in the target E-block based on a size of the motion vector associated with spatially preceding one or more of the E-blocks in the frame to be encoded, and sizes of the motion vectors associated with a spatially identical but temporally preceding E-block in the reference frame and a plurality of E-blocks adjoining the spatially identical but temporally preceding E-block, the spatially preceding one or more of the E-blocks, the spatially identical but temporally preceding E-block, and the adjoining E-blocks having been encoded before the target E-block.

9. The motion vector detection method according to claim 2, wherein the plurality of motion estimation modes define a coarser search resolution in accordance with an increase in the search area.

10. The motion vector detection method according to claim 1, further comprising:

a step of determining whether the S-block having the highest correlation is located at a border of the search area or not; and a step of newly calculating, for each of a plurality of S-blocks demarcated outside the search area in the reference frame, an evaluation index representing a correlation between the S-block and the target E-block if the S-block having the highest correlation is located at a border of the search area, wherein the step of detecting compares a plurality of the evaluation indices inside and outside the search area in the reference frame, and determines the S-block having the highest correlation as the correlated block.

11. The motion vector detection method according to claim 2, further comprising:

a step of determining whether the S-block having the highest correlation is located at a border of the search area or not; and a step of newly calculating, for each of the plurality of S-blocks demarcated outside the search area in the reference frame, an evaluation index representing a correlation between the S-block and the target E-block if the S-block having the highest correlation is located at a border of the search area, wherein the step of detecting compares a plurality of the evaluation indices inside and outside the search area in the reference frame, and determines the S-block having the highest correlation as the correlated block.

12. The motion vector detection method according to claim 10, wherein the step of newly calculating and the step of detecting comprise searching for an S-block having a progressively higher correlation by a technique of calculating and comparing an evaluation index of a neighboring S-block in a one-at-a-time fashion, starting from the S-block having the highest correlation within the search area in the reference frame.

13. The motion vector detection method according to claim 11, wherein the step of newly calculating and the step of detecting comprise searching for an S-block having a progressively higher correlation by a technique of calculating and comparing an evaluation index of a neighboring S-block in a one-at-a-time fashion, starting from the S-block having the highest correlation within the search area in the reference frame.

14. The motion vector detection method according to claim 1, further comprising:
   a step of oversampling the reference frame with a resolution higher than a full-pixel resolution;
   a step of calculating, for each of predetermined pixel blocks in the oversampled reference frame, an evaluation index representing a correlation between the pixel block and the target E-block, the calculation being centered around a pixel position represented by the motion vector having a full-pixel resolution detected by the step of detecting; and
   a step of detecting, with a resolution higher than a full-pixel resolution, a temporal/spatial difference between a correlated block and the target E-block as a motion vector associated with the target E-block, wherein the correlated block is one of the pixel blocks having a highest correlation as determined by comparing a plurality of the evaluation indices against one another.

15. The motion vector detection method according to claim 2, further comprising:
   a step of oversampling the reference frame with a resolution higher than a full-pixel resolution;
   a step of calculating, for each of predetermined pixel blocks in the oversampled reference frame, an evaluation index representing a correlation between the pixel block and the target E-block, the calculation being centered around a pixel position represented by the motion vector having a full-pixel resolution detected by the step of detecting; and
   a step of detecting, with a resolution higher than a full-pixel resolution, a temporal/spatial difference between a correlated block and the target E-block as a motion vector associated with the target E-block, wherein the correlated block is one of the pixel blocks having a highest correlation as determined by comparing a plurality of the evaluation indices against one another.

16. A motion vector detection apparatus for detecting a motion vector in a frame to be encoded which is used in motion-compensated predictive encoding of moving pictures, said apparatus comprising:
   a block division section operable to divide the frame to be encoded into a plurality of E-blocks of a predetermined pixel size;
   a motion amount prediction section operable to predict an amount of motion in a target E-block to be processed by using a motion vector associated with a block which is encoded before the target E-block;
   a search area determination section operable to determine a search area in a reference frame in accordance with the amount of motion in the target E-block as predicted by the motion amount prediction section, wherein the reference frame is an already-encoded frame;
   a motion vector detection section operable to calculate an evaluation index for each of a plurality of S-blocks which are demarcated in the search area determined in the reference frame by the search area determination section, the plurality of S-blocks being at a predetermined pixel interval and each having the predetermined pixel size, wherein the evaluation index represents a correlation between the S-block and the target E-block, and operable to detect a motion vector associated with the target E-block in accordance with a temporal/spatial difference between a correlated block and the target E-block, wherein the correlated block is one of the plurality of S-blocks having a highest correlation as determined by comparing a plurality of the evaluation indices against one another,
   wherein said search area determination section is operable to determine, from among a plurality of predefined motion estimation modes each defining a respectively different search area in the reference frame, a motion estimation mode corresponding to the predicted amount of motion in the target E-block; and
   wherein said motion vector detection section is operable to extract pixel data from within the target E-block and pixel data from within the search area in the reference frame in accordance with the determined motion estimation mode, operable to calculate a sum of absolute differences in pixel data between the target E-block and each of the plurality of S-blocks as the evaluation index, and operable to detect the temporal/spatial offset between the correlated block and the target E-block as the motion vector associated with the target E-block.

17. A program embodied on a computer readable medium for realizing a method for detecting a motion vector in a frame to be encoded which is used in motion-compensated predictive encoding of moving pictures, the method comprising:
   a step of dividing the frame to be encoded into a plurality of E-blocks of a predetermined pixel size;
   a step of predicting an amount of motion in a target E-block to be processed by using a motion vector associated with a block which is encoded before the target E-block;
   a step of determining a search area in a reference frame in accordance with the predicted amount of motion in the target E-block, wherein the reference frame is an already-encoded frame;
   a step of calculating an evaluation index for each of a plurality of S-blocks which are demarcated in the search area determined in the reference frame, the plurality of S-blocks being at a predetermined pixel interval and each having the predetermined pixel size, wherein the evaluation index represents a correlation between the S-block and the target E-block; and
   a step of detecting a motion vector associated with the target E-block in accordance with a temporal/spatial difference between a correlated block and the target E-block, wherein the correlated block is one of the plurality of S-blocks having a highest correlation as determined by comparing a plurality of the evaluation indices against one another,
   wherein the step of determining determines, from among a plurality of predefined motion estimation modes each defining a respectively different search area in the reference frame, a motion estimation mode corresponding to the predicted amount of motion in the target E-block;
   wherein the step of calculating extracts pixel data from within the target E-block and pixel data from within the search area in the reference frame in accordance with the determined motion estimation mode, and calculates a sum of absolute differences in pixel data between the target E-block and each of the plurality of S-blocks as the evaluation index; and wherein the step of detecting detects the temporal/spatial offset between the correlated block and the target E-block as the motion vector associated with the tar2et E-block.

18. A motion vector detection apparatus for detecting a motion vector in a frame to be encoded which is used in motion-compensated predictive encoding of moving pictures, said apparatus comprising:

a block division section operable to divide the frame to be encoded into a plurality of E-blocks of a predetermined pixel size;

a motion amount prediction section operable to predict an amount of motion in a target E-block to be processed by using a motion vector associated with a block which is encoded before the target E-block;

a search area determination section operable to determine a search area in a reference frame in accordance with the amount of motion in the target E-block as predicted by the motion amount prediction section, wherein the reference frame is an already-encoded frame;

a motion vector detection section operable to calculate an evaluation index for each of a plurality of S-blocks which are demarcated in the search area determined in the reference frame by the search area determination section, the plurality of S-blocks being at a predetermined pixel interval and each having the predetermined pixel size, wherein the evaluation index represents a correlation between the S-block and the target E-block, and operable to detect a motion vector associated with the target E-block in accordance with a temporal/spatial difference between a correlated block and the target E-block, wherein the correlated block is one of the plurality of S-blocks having a highest correlation as determined by comparing a plurality of the evaluation indices against one another, wherein said search area determination section is operable to determine, from among a plurality of predefined motion estimation modes each defining a respectively different search area in the reference frame and a search resolution, a motion estimation mode corresponding to the predicted amount of motion in the target E-block; and wherein said motion vector detection section is operable to extract pixel data from within the target E-block and pixel data from within the search area in the reference frame in accordance with the determined motion estimation mode, the extracted pixel data being decimated in accordance with the search resolution, operable to calculate a sum of absolute differences in pixel data between the target E-block and each of the plurality of S-blocks as the evaluation index, and operable to detect the temporal/spatial offset between the correlated block and the target E-block as the motion vector associated with the target E-block.

19. A program embodied on a computer readable medium for realizing a method for detecting a motion vector in a frame to be encoded which is used in motion-compensated predictive encoding of moving pictures, the method comprising:

a step of dividing the frame to be encoded into a plurality of E-blocks of a predetermined pixel size;

a step of predicting an amount of motion in a target E-block to be processed by using a motion vector associated with a block which is encoded before the target E-block;

a step of determining a search area in a reference frame in accordance with the predicted amount of motion in the target E-block, wherein the reference frame is an already-encoded frame;

a step of calculating an evaluation index for each of a plurality of S-blocks which are demarcated in the search area determined in the reference frame, the plurality of S-blocks being at a predetermined pixel interval and each having the predetermined pixel size, wherein the evaluation index represents a correlation between the S-block and the target E-block; and a step of detecting a motion vector associated with the target E-block in accordance with a temporal/spatial difference between a correlated block and the target E-block, wherein the correlated block is one of the plurality of S-blocks having a highest correlation as determined by comparing a plurality of the evaluation indices against one another, wherein the step of determining determines, from among a plurality of predefined motion estimation modes each defining a respectively different search area in the reference frame and a search resolution, a motion estimation mode corresponding to the predicted amount of motion in the target E-block;

wherein the step of calculating extracts pixel data from within the target E-block and pixel data from within the search area in the reference frame in accordance with the determined motion estimation mode, the extracted pixel data being decimated in accordance with the search resolution, and calculates a sum of absolute differences in pixel data between the target E-block and each of the plurality of S-blocks as the evaluation index; and wherein the step of detecting detects the temporal/spatial offset between the correlated block and the target E-block as the motion vector associated with the target E-block.

* * * * *

UNITED STATES PATENT AND TRADEMARK OFFICE
CERTIFICATE OF CORRECTION

PATENT NO. : 7,050,502 B2  Page 1 of 1
APPLICATION NO. : 10/243844
DATED : May 23, 2006
INVENTOR(S) : Tomoko Yasunari et al.

It is certified that error appears in the above-identified patent and that said Letters Patent is hereby corrected as shown below:

Title Page,
Item [56], References Cited, U.S. Patent Documents, "6,674,798 B1 * 1/2004 Uramoto et al." should read --6,674,798 B1 * 1/2004 Ishihara et al.--

Column 23,
Line 4, "another." should read --another,--.

Column 27,
Line 3, "tar2et" should read --target--.

Signed and Sealed this

Ninth Day of January, 2007

JON W. DUDAS
*Director of the United States Patent and Trademark Office*